US006870661B2

(12) United States Patent
Pullen et al.

(10) Patent No.: US 6,870,661 B2
(45) Date of Patent: Mar. 22, 2005

(54) ELECTROPHORETIC DISPLAYS CONTAINING MAGNETIC PARTICLES

(75) Inventors: Anthony Edward Pullen, Belmont, MA (US); Ian D. Morrison, Acton, MA (US); Emily J. Pratt, Brookline, MA (US)

(73) Assignee: E Ink Corporation, Cambridge, MA (US)

(*) Notice: Subject to any disclaimer, the term of this patent is extended or adjusted under 35 U.S.C. 154(b) by 296 days.

(21) Appl. No.: 10/063,655

(22) Filed: May 7, 2002

(65) Prior Publication Data

US 2002/0171910 A1 Nov. 21, 2002

Related U.S. Application Data

(60) Provisional application No. 60/291,086, filed on May 15, 2001.

(51) Int. Cl.[7] ............... G02B 26/00; G09G 3/34; G03G 17/04; G01R 1/12
(52) U.S. Cl. ............... 359/296; 345/107; 430/32; 204/600
(58) Field of Search ............... 359/296, 297, 359/290, 238, 237; 430/32, 34, 38; 345/105, 107; 204/600, 450

(56) References Cited

U.S. PATENT DOCUMENTS

| | | | |
|---|---|---|---|
| 2,800,457 A | 7/1957 | Green et al. | 428/402.2 |
| 3,036,388 A | 5/1962 | Tate | 434/409 |
| 3,406,363 A | 10/1968 | Tate | 335/302 |
| 3,460,248 A | 8/1969 | Tate | 29/607 |
| 3,639,133 A | 2/1972 | Lirton | 106/298 |
| 3,668,106 A | 6/1972 | Ota | 358/305 |
| 3,670,323 A | 6/1972 | Sobel et al. | 345/107 |
| 3,756,693 A | 9/1973 | Ota | 345/107 |
| 3,767,392 A | 10/1973 | Ota | 430/35 |
| 3,792,308 A | 2/1974 | Ota | 315/150 |

(List continued on next page.)

FOREIGN PATENT DOCUMENTS

| | | | |
|---|---|---|---|
| EP | 962808 A2 * | 12/1999 | ........... G02F/1/167 |
| EP | 1 162 496 A1 | 12/2001 | |
| JP | 05-108016 A | 4/1993 | |
| JP | 05-108017 A | 4/1993 | |
| JP | 05-143009 A | 6/1993 | |
| JP | 06-118452 A | 4/1994 | |
| JP | 07-146660 A | 6/1995 | |
| JP | 11-015412 A | 1/1999 | |
| JP | 2000-122577 | 4/2000 | |
| WO | WO 99/67678 | 12/1999 | |
| WO | WO 00/05704 | 2/2000 | |
| WO | WO 00/20922 | 4/2000 | |
| WO | WO 00/26761 | 5/2000 | |
| WO | WO 00/36560 | 6/2000 | |
| WO | WO 00/38000 | 6/2000 | |

(List continued on next page.)

OTHER PUBLICATIONS

Ballinger, D.O., "Magnetic recording paper is erasable", Electronics, Mar. 1, 1973, pp. 73–76.

(List continued on next page.)

Primary Examiner—Scott J. Sugarman
Assistant Examiner—Tuyen Tra
(74) Attorney, Agent, or Firm—David J. Cole

(57) ABSTRACT

An electrophoretic medium comprises a plurality of one or more types of particles suspended in a suspending fluid. The particles include at least one electrically charged, electrophoretically mobile particle capable of translating through the suspending fluid upon application of an electric field to the medium and at least one magnetic particle. A magnet is disposed adjacent the electrophoretic medium to introduce a threshold resistance to magnetic particle movement.

38 Claims, 4 Drawing Sheets

U.S. PATENT DOCUMENTS

| | | | |
|---|---|---|---|
| 3,870,517 A | 3/1975 | Ota et al. | 430/38 |
| 3,892,568 A | 7/1975 | Ota | 430/19 |
| 4,001,140 A | 1/1977 | Foris et al. | 427/213.34 |
| 4,123,346 A | 10/1978 | Ploix | 359/271 |
| 4,143,472 A | 3/1979 | Murata et al. | 434/409 |
| 4,272,596 A | 6/1981 | Harbour et al. | 430/37 |
| 4,273,672 A | 6/1981 | Vassiliades | 264/4.1 |
| 4,368,952 A | 1/1983 | Murata et al. | 359/296 |
| 4,419,383 A | 12/1983 | Lee | 427/550 |
| 4,919,521 A | 4/1990 | Tada et al. | 359/296 |
| 5,057,363 A | 10/1991 | Nakanishi | 428/321.5 |
| 5,151,032 A | 9/1992 | Igawa | 434/409 |
| 5,298,833 A | 3/1994 | Hou | 313/483 |
| 5,411,398 A | 5/1995 | Nakanishi et al. | 434/409 |
| 5,543,219 A | 8/1996 | Elwakil | 428/402.24 |
| 5,699,097 A | 12/1997 | Takayama et al. | 347/171 |
| 5,745,094 A | 4/1998 | Gordon, II et al. | 345/107 |
| 5,814,687 A * | 9/1998 | Kasai et al. | 523/223 |
| 5,930,026 A | 7/1999 | Jacobson et al. | 359/256 |
| 5,961,804 A | 10/1999 | Jacobson et al. | 204/606 |
| 5,972,493 A | 10/1999 | Iwasaki et al. | 428/323 |
| 6,017,584 A | 1/2000 | Albert et al. | 427/313.3 |
| 6,025,896 A | 2/2000 | Hattori et al. | 349/86 |
| 6,055,091 A | 4/2000 | Sheridon et al. | 359/296 |
| 6,067,185 A | 5/2000 | Albert et al. | 359/296 |
| 6,097,531 A | 8/2000 | Sheridon | 359/296 |
| 6,110,538 A | 8/2000 | Sheridon | 427/457 |
| 6,113,810 A | 9/2000 | Hou et al. | 252/572 |
| 6,118,426 A | 9/2000 | Albert et al. | 345/107 |
| 6,120,588 A | 9/2000 | Jacobson | 106/31.16 |
| 6,120,839 A | 9/2000 | Comiskey et al. | 427/213.3 |
| 6,124,851 A | 9/2000 | Jacobson | 345/206 |
| 6,130,773 A | 10/2000 | Jacobson et al. | 359/296 |
| 6,130,774 A | 10/2000 | Albert et al. | 359/296 |
| 6,147,791 A | 11/2000 | Sheridon | 359/296 |
| 6,177,921 B1 | 1/2001 | Comiskey et al. | 345/107 |
| 6,211,998 B1 * | 4/2001 | Sheridon | 359/296 |
| 6,232,950 B1 | 5/2001 | Albert et al. | 345/107 |
| 6,239,896 B1 | 5/2001 | Ikeda | 359/240 |
| 6,241,921 B1 * | 6/2001 | Jacobson et al. | 264/1.36 |
| 6,249,271 B1 | 6/2001 | Albert | 345/107 |
| 6,252,564 B1 | 6/2001 | Albert | 345/1.3 |
| 6,262,706 B1 | 7/2001 | Albert | 345/107 |
| 6,262,833 B1 | 7/2001 | Loxley et al. | 359/296 |
| 6,300,932 B1 | 10/2001 | Albert | 345/107 |
| 6,312,304 B1 * | 11/2001 | Duthaler et al. | 445/24 |
| 6,312,971 B1 | 11/2001 | Amundson et al. | 438/99 |
| 6,323,989 B1 | 11/2001 | Jacobson et al. | 359/296 |
| 6,327,072 B1 | 12/2001 | Comiskey et al. | 359/296 |
| 6,330,054 B1 | 12/2001 | Ikami | 355/400 |
| 6,376,828 B1 | 4/2002 | Comiskey | 250/216 |
| 6,377,387 B1 | 4/2002 | Duthaler et al. | 359/296 |
| 6,392,786 B1 | 5/2002 | Albert | 359/296 |
| 6,413,790 B1 | 7/2002 | Duthaler et al. | 438/21 |
| 6,445,489 B1 | 9/2002 | Jacobson et al. | 359/296 |
| 6,459,418 B1 | 10/2002 | Comiskey et al. | 345/107 |
| 6,473,072 B1 | 10/2002 | Comiskey et al. | 345/173 |
| 6,498,114 B1 | 12/2002 | Amundson et al. | 438/780 |
| 6,504,524 B1 | 1/2003 | Gates et al. | 345/107 |
| 6,506,438 B2 | 1/2003 | Duthaler et al. | 427/58 |
| 6,515,649 B1 | 2/2003 | Albert et al. | 345/107 |
| 6,515,790 B2 * | 2/2003 | Miyamoto et al. | 359/296 |
| 6,518,949 B2 | 2/2003 | Drzaic | 345/107 |
| 2001/0045934 A1 | 11/2001 | Turner et al. | 345/107 |
| 2002/0019081 A1 | 2/2002 | Denis et al. | 438/149 |
| 2002/0021270 A1 | 2/2002 | Albert | 345/84 |
| 2002/0053900 A1 | 5/2002 | Jacobson et al. | 324/100 |
| 2002/0060321 A1 | 5/2002 | Kazlas et al. | 257/66 |
| 2002/0063661 A1 | 5/2002 | Comiskey et al. | 345/55 |
| 2002/0063677 A1 | 5/2002 | Drzaic | 345/107 |
| 2002/0090980 A1 | 7/2002 | Wilcox et al. | 455/566 |
| 2002/0106847 A1 | 8/2002 | Kazlas et al. | 438/200 |
| 2002/0113770 A1 | 8/2002 | Jacobson et al. | 345/107 |
| 2002/0130832 A1 | 9/2002 | Baucom et al. | 345/107 |
| 2002/0131147 A1 | 9/2002 | Paolini, Jr. et al. | 359/296 |
| 2002/0145792 A1 | 10/2002 | Jacobson et al. | 359/296 |
| 2002/0154382 A1 | 10/2002 | Morrison et al. | 359/296 |
| 2002/0180687 A1 | 12/2002 | Webber | 345/107 |
| 2002/0185378 A1 | 12/2002 | Honeyman et al. | 204/601 |

FOREIGN PATENT DOCUMENTS

| | | |
|---|---|---|
| WO | WO 00/38001 | 6/2000 |
| WO | WO 00/67110 | 11/2000 |
| WO | WO 00/67327 | 11/2000 |
| WO | WO 01/07961 | 2/2001 |
| WO | WO 01/08241 | 2/2001 |
| WO | WO 01/17029 | 3/2001 |

OTHER PUBLICATIONS

Chen, Y., et al., "A Conformable Electronic Ink Display using a Foil–Based a–Si TFT Array", SID 01 Digest, 157 (Jun. 2001).

Comiskey, B., et al., "An electrophoretic ink for all–printed reflective electronic displays", Nature, 394, 253 (1998).

Comiskey, B., et al., "Electrophoretic Ink: A Printable Display Material", SID 97 Digest (1997), p. 75.

Drzaic, P., et al., "A Printed and Rollable Bistable Electronic Display", SID 98 Digest (1998), p. 1131.

Gutcho, M.H., Microcapsules and MIcroencapsulation Techniques, Noyes Data Corp., Park Ridge NJ, (1976).

Harbour, J.R., et al., "Ferrofluids as a Contrasting Fluid for Electrophoretic Display", Photo. Sci. Eng., 26, 30 (1982).

Hou, J., et al., "Active Matrix Electrophoretic Displays Containing Black and White Particles with Opposite Polarities", SID 01 Digest, 164 (Jun. 2001).

Jacobson, J., et al., "The last book", IBM Systems J., 36, 457 (1997).

Kazlas, P., et al., "12.1" SVGA Microencapsulated Electrophoretic Active Matrix Display for Information Appliances, SID 01 Digest, 152 (Jun. 2001).

Lee, L.L., "A Magnetic–Particles Display", Proceedings of the SID, 16, 177 (1975).

Lee, L.L., "Fabrication of Magnetic Particles Displays", Proceedings of the SID, 18, 283 (1977).

Ota, I., et al., "Developments in Electrophoretic Displays", Proceedings of the SID, 18, 243 (1977).

Ota, I., et al., "Electrophoretic display devices", Laser 75 Optoelectronics Conference Proceedings, 145 (1975).

Ota, I., et al., "Electrophoretic Image Display (EPID) Panel", Proceedings of the IEEE, 61, 832 (1973).

Vandegaer, J.E. (ed.), "Microencapsulation Processes and Applications", pp. v–x, 1–180 (Plenum Press, New York 1974).

\* cited by examiner

ELECTROPHORETIC DISPLAYS CONTAINING MAGNETIC PARTICLES

CROSS REFERENCE TO RELATED APPLICATION

This application claims priority from Provisional Application Ser. No. 60/291,086 filed May 15, 2001.

BACKGROUND OF INVENTION

This invention relates to electrophoretic displays containing magnetic (i.e., ferromagnetic or ferrimagnetic) particles, and to media for use in such displays. More specifically, this invention relates to such displays and media in which the magnetic particles are used either to provide a threshold for switching of the optical states of the displays and media, or to allow the displays and media to exhibit more than two colors at any one pixel.

Electrophoretic displays have been the subject of intense research and development for a number of years. Such displays can have attributes of good brightness and contrast, wide viewing angles, optical state bistability, and low power consumption when compared with liquid crystal displays. (The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element.) Nevertheless, problems with the long-term image quality of these displays have prevented their widespread usage. For example, particles that make up electrophoretic displays tend to settle, resulting in inadequate service-life for these displays.

Numerous patents and applications assigned to or in the names of the Massachusetts Institute of Technology and E Ink Corporation have recently been published describing encapsulated electrophoretic media. Such encapsulated media comprise numerous small capsules, each of which itself comprises an internal phase containing electrophoretically mobile particles suspended in a liquid suspension medium, and a capsule wall surrounding the internal phase. Typically, the capsules are themselves held within a polymeric binder to form a coherent layer positioned between two electrodes. Encapsulated media of this type are described, for example, in U.S. Pat. Nos. 5,930,026; 5,961,804; 6,017,584; 6,067,185; 6,118,426; 6,120,588; 6,120,839; 6,124,851; 6,130,773; 6,130,774; 6,172,798; 6,177,921; 6,232,950; 6,241,921; 6,249,271; 6,252,564; 6,262,706; 6,262,833; 6,300,932; 6,312,304; 6,312,971; 6,323,989; 6,327,072; 6,376,828; and 6,377,387; U.S. Patent Application Publication Nos. 2001-0045934; 2002-0018042; 2002-0019081; and 2002-0021270; and International Applications Publication Nos. WO 97/04398; WO 98/03896; WO 98/19208; WO 98/41898; WO 98/41899; WO 99/10767; WO 99/10768; WO 99/10769; WO 99/47970; WO 99/53371; WO 99/53373; WO 99/56171; WO 99/59101; WO 99/67678; WO 00/03349; WO 00/03291; WO 00/05704; WO 00/20921; WO 00/20922; WO 00/20923; WO 00/26761; WO 00/36465; WO 00/36560; WO 00/36666; WO 00/38000; WO 00/38001; WO 00/59625; WO 00/60410; WO 00/67110; WO 00/67327 WO 01/02899; WO 01/07691; WO 01/08241; WO 01/08242; WO 01/17029; WO 01/17040; WO 01/17041; WO 01/80287 and WO 02/07216. The entire disclosures of all these patents and published applications are herein incorporated by reference.

Known electrophoretic media, both encapsulated and unencapsulated, can be divided into two main types, referred to hereinafter for convenience as "single particle" and "dual particle" respectively. A single particle medium has only a single type of electrophoretic particle suspended in a colored medium, at least one optical characteristic of which differs from that of the particles. (In referring to a single type of particle, we do not imply that all particles of the type are absolutely identical. For example, provided that all particles of the type possess substantially the same optical characteristic and a charge of the same polarity, considerable variation in parameters such as particle size and electrophoretic mobility can be tolerated without affecting the utility of the medium.) The optical characteristic is typically color visible to the human eye, but may, alternatively or in addition, be any one or more of reflectivity, retroreflectivity, luminescence, fluorescence, phosphorescence, or color in the broader sense of meaning a difference in absorption or reflectance at non-visible wavelengths. When such a medium is placed between a pair of electrodes, at least one of which is transparent, depending upon the relative potentials of the two electrodes, the medium can display the optical characteristic of the particles (when the particles are adjacent the electrode closer to the observer, hereinafter called the "front" electrode) or the optical characteristic of the suspending medium (when the particles are adjacent the electrode remote from the observer, hereinafter called the "rear" electrode, so that the particles are hidden by the colored suspending medium).

A dual particle medium has two different types of particles differing in at least one optical characteristic and a suspending fluid which may be uncolored or colored, but which is typically uncolored. The two types of particles differ in electrophoretic mobility; this difference in mobility may be in polarity (this type may hereinafter be referred to as an "opposite charge dual particle" medium) and/or magnitude. When such a dual particle medium is placed between the aforementioned pair of electrodes, depending upon the relative potentials of the two electrodes, the medium can display the optical characteristic of either set of particles, although the exact manner in which this is achieved differs depending upon whether the difference in mobility is in polarity or only in magnitude. For ease of illustration, consider an electrophoretic medium in which one type of particles are black and the other type white. If the two types of particles differ in polarity (if, for example, the black particles are positively charged and the white particles negatively charged), the particles will be attracted to the two different electrodes, so that if, for example, the front electrode is negative relative to the rear electrode, the black particles will be attracted to the front electrode and the white particles to the rear electrode, so that the medium will appear black to the observer. Conversely, if the front electrode is positive relative to the rear electrode, the white particles will be attracted to the front electrode and the black particles to the rear electrode, so that the medium will appear white to the observer.

If the two types of particles have charges of the same polarity, but differ in electrophoretic mobility (this type of medium may hereinafter to referred to as a "same polarity dual particle" medium), both types of particles will be attracted to the same electrode, but one type will reach the electrode before the other, so that the type facing the observer differs depending upon the electrode to which the particles are attracted. For example suppose the previous illustration is modified so that both the black and white particles are positively charged, but the black particles have the higher electrophoretic mobility. If now the front electrode is negative relative to the rear electrode, both the black and white particles will be attracted to the front electrode, but the black particles, because of their higher mobility, will reach it first, so that a layer of black particles will coat the front electrode and the medium will appear black to the observer. Conversely, if the front electrode is positive relative to the rear electrode, both the black and white particles will be attracted to the rear electrode, but the black particles, because of their higher mobility will reach it first, so that a layer of black particles will coat the rear electrode, leaving a layer of white particles remote from the rear electrode and facing the observer, so that the medium will appear white to the observer: note that this type of dual particle medium requires that the suspending fluid to sufficiently transparent to allow the layer of white particles remote from the rear electrode to be readily visible to the observer. Typically, the suspending fluid in such a display is not colored at all, but some color may be incorporated for the purpose of correcting any undesirable tint in the white particles seen therethrough.

Both single and dual particle electrophoretic displays may be capable of intermediate gray states having optical characteristics intermediate the two extreme optical states already described.

Many of the aforementioned patents and applications recognize that the walls surrounding the discrete microcapsules in an encapsulated electrophoretic medium could be replaced by a continuous phase, thus producing a so-called polymer-dispersed electrophoretic display in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, WO 01/02899, at page 10, lines 6–19 and U.S. application Ser. No. 09/683,903 filed Feb. 28, 2002, the entire disclosure of which is herein incorporated by reference. Accordingly, for purposes of the present application, such polymer-dispersed electrophoretic media are regarded as sub-species of encapsulated electrophoretic media.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; and other similar techniques.) Thus, the resulting display can be flexible. Further, because the display medium can be printed (using a variety of methods), the display itself can be made inexpensively.

One problem with existing electrophoretic displays, whether encapsulated or unencapsulated, is that they have essentially no threshold for switching, i.e., that even a small electric field applied for a long period will cause the display to switch between its optical states. This lack of a threshold has hitherto prevented electrophoretic displays from being addressed by passive matrix techniques, and has necessitated the use of active matrix techniques. Active matrix addressing schemes, such as the use of thin film transistor (TFT) arrays having at least one transistor for each pixel of the display, are substantially more expensive than passive matrix addressing schemes, and hence the cost of electrophoretic displays could be reduced if an electrophoretic medium could be provided which had a switching threshold.

Another problem in most electrophoretic displays is that any individual pixel can only display two colors (the colors of the dye and the single particle in a single particle display, or the colors of the two different types of particles in a dual particle display) together with intermediate gray states between these two colors, and this inability to display more than two colors leads to difficulties in providing full color displays. If, for example, one wishes to provide an electrophoretic display which imitates a book having black text on white paper, with occasional use of spot color for illustrations, it is highly desirable that each pixel of such a display be capable of showing pure black and pure white in order that the display can produce sharp, highly legible text, since the human eye is much more sensitive to loss of resolution in text than in colored graphic images. However, if each pixel is to display both pure black and pure white, color images can only be produced if each pixel is also capable of displaying a third color.

Alternatively, if the electrophoretic display is to be used to provide a full color RGB or CMY display (for example, as a substitute for a color liquid crystal display), the reflective nature of an electrophoretic display leads to problems in obtaining satisfactory color saturation. For example, if one provides a display which can produce color images on a white background by using three types of dual particle capsules having respectively white/red, white/green and white/blue states, when a red color is desired at most only one-third of the area of the display can be switched to red, and the resultant color will not appear highly saturated. If each capsule could display three colors, one could use capsules having white/red/green, white/green/blue and white/blue/red states, so that when a red color is desired about two-thirds of the area of the display could be switched to red, resulting in a substantially more saturated red.

The aforementioned U.S. Pat. No. 6,017,584 and published International Application WO 99/10768 describe and claim an encapsulated electrophoretic display in which each capsule contains three different types of particles, each having a different color, the three types of particles having substantially non-overlapping electrophoretic mobilities. By applying to such a capsule a sequence of electrical pulses controlled in both time and amplitude, the capsule can display the color of any selected one of the three types of particles. While this type of display can give good results, in some cases it may be difficult to ensure that the three types of particles can retain substantially non-overlapping electrophoretic mobilities over a range of operating conditions, so that some muddying of the colors may result. Also, since at least three separate pulses are required to display one of the three colors, the switching of such a display will be slower than that of a dual particle display.

It has now been realized that the aforementioned problems with electrophoretic displays can be reduced or eliminated by including in the display at least one type of particle which is magnetic, and the present invention relates to electrophoretic media and displays including magnetic particles.

SUMMARY OF THE INVENTION

Accordingly, this invention provides an electrophoretic medium comprising a plurality of one or more types of particles suspended in a suspending fluid, said particles including at least one electrically charged, electrophoretically mobile particle, and at least one magnetic particle. The present medium may comprise a type of particle which is both magnetic and electrophoretically mobile, or it may include a first type of particle which is magnetic but not electrophoretically mobile, and a second type of particle which is non-magnetic but is electrophoretically mobile; in either case, the medium may comprise an additional type of particle which is non-magnetic but is electrophoretically mobile. This invention also extends to an electrophoretic display comprising an electrophoretic medium of the present invention and at least one electrode disposed adjacent to this medium.

The media and displays provided by the present invention may be of any of the types (namely single particle, opposite charge dual particle, and same polarity dual particle) previously described. One embodiment of the invention, illustrated below in FIG. 1, is a single particle medium in which the particles are both magnetic and electrophoretically mobile and suspended in a colored suspending fluid; this embodiment provides a single particle two color medium with a switching threshold. A second embodiment of the invention, illustrated in FIG. 2, is a dual particle medium in which one type of particle is magnetic and electrophoretically mobile, bearing a charge of one polarity, and the second type of particle is non-magnetic but is electrophoretically mobile, bearing a charge of opposite polarity to the first type of particle. There are two variants of this second embodiment. In the first variant, the suspending fluid is uncolored; this provides a dual particle two color medium with a switching threshold. In the second variant, the suspending fluid is colored; this provides a three color medium. A third embodiment of the invention, illustrated in FIG. 3, comprises a three particle medium having first and second types of particles which are non-magnetic but electrophoretically mobile, these two types of particles having charges of opposite polarity, and a third type of particle which is magnetic. Again, there are two variants of this embodiment, depending upon whether the third type of particle is or is not electrophoretically mobile. Normally, the third type of particle will be electrophoretically mobile and will bear a charge of the same polarity as one of the first and second types of particles. However, it is possible to have the third type of particle not be electrophoretically mobile, and to write on such a display using a magnetic writing head. (Obviously, even if a magnetic particle is electrophoretically mobile, it can still be addressed by a magnetic writing head when it is not subject to an electric field.) Finally, a fourth embodiment of the invention, illustrated in FIG. 4, comprises a three particle medium having first and second types of particles which are non-magnetic but electrophoretically mobile, these two types of particles having charges of the same polarity, and a third type of particle which is magnetic and electrophoretically mobile, bearing a charge of opposite polarity to the first and second types of particles.

This invention also provides a first method of addressing an electrophoretic medium, the method comprising:

(a) providing an electrophoretic medium having opposed first and second surfaces, the medium comprising a suspending fluid having a first optical characteristic, and a plurality of electrically charged magnetic particles suspended in the suspending fluid, the particles having a second optical characteristic different from the first optical characteristic, the medium having a magnet disposed adjacent its first surface;

(b) allowing the particles to remain adjacent the first surface of the display under the magnetic forces applied to the particles by the magnet, thereby causing the first optical characteristic of the fluid to be visible at the second surface of the medium; and (c) applying to the medium an electric field having a polarity and magnitude sufficient to cause the particles to move through the suspending fluid against the magnetic forces applied to the particles by the magnet, thereby causing the particles to move adjacent the second surface of the medium and the second optical characteristic of the particles to be visible at the second surface.

This invention also provides a second method of addressing an electrophoretic medium, the method comprising:

(a) providing an electrophoretic medium having opposed first and second surfaces, the medium comprising a suspending fluid, a plurality of a first type of electrically charged magnetic particles having a first optical characteristic suspended in the suspending fluid, and a plurality of a second type of electrically charged non-magnetic particles having a second optical characteristic different from the first optical characteristic, the second type of particles bearing charges of opposite polarity to the charges on the first type of particles, the medium having a magnet disposed adjacent its first surface;

(b) applying to the medium an electric field having a polarity which causes the second type of particles to move adjacent the second surface of the medium, while causing the first type of particles to remain adjacent the first surface of the medium, thereby causing the second optical characteristic to be visible at the second surface; and (c) applying to the medium an electric field having a polarity and magnitude sufficient to cause the first particles to move through the suspending fluid against the magnetic forces applied to the first particles by the magnet, thereby causing the first particles to move adjacent the second surface of the medium and the first optical characteristic to be visible at the second surface, while the second particles move adjacent the first surface of the medium.

This invention also provides a third method of addressing an electrophoretic medium, the method comprising:

(a) providing an electrophoretic medium having opposed first and second surfaces, the medium comprising a suspending fluid, a plurality of a first type of electrically charged magnetic particles having a first optical characteristic suspended in the suspending fluid, a plurality of a second type of electrically charged non-magnetic particles having a second optical characteristic different from the first optical characteristic, the first and second types of particles bearing charges of the same polarity, and a third type of electrically charged non-magnetic particles having a third optical characteristic different from the first and second optical characteristics, the third type of particles bearing charges of opposite polarity to those on the first and second types of particles, the medium having a magnet disposed adjacent its first surface;

(b) applying to the medium an electric field having a polarity which causes the third type of particles to move adjacent the second surface of the medium, while causing the first and second types of particles to remain adjacent the first surface of the medium, thereby causing the third optical characteristic to be visible at the second surface;

(c) applying to the medium an electric field having a polarity and magnitude sufficient to cause the second type of particles to move adjacent the second surface of the medium and the third type of particles to move adjacent the first surface of the medium, but insufficient to cause the first type of particles to move away from the first surface of the medium against the magnetic forces acting on the first type of particles, thereby causing the second optical characteristic to be visible at the second surface; and (d) applying to the medium an electric field having a polarity and magnitude sufficient to cause the second type of particles to move adjacent the second surface of the medium and the third type of particles to move adjacent the first surface of the medium, the magnitude of the electric field being sufficient to cause the first type of particles to move away from the first surface of the medium against the magnetic forces acting on the first type of particles and lie adjacent the second surface of the medium, thereby causing the first and second optical characteristics to be visible at the second surface.

This invention also provides a fourth method of addressing an electrophoretic medium, the method comprising:

(a) providing an electrophoretic medium having opposed first and second surfaces, the medium comprising a suspending fluid, a plurality of a first type of electrically charged magnetic particle having a first optical characteristic suspended in the suspending fluid, a plurality of a second type of electrically charged non-magnetic particle having a second optical characteristic different from the first optical characteristic, the first and second types of particles bearing charges of opposite polarity, and a plurality of a third type of electrically charged non-magnetic particle having a third optical characteristic different from the first and second optical characteristics, the second and third types of particles bearing charges of the same polarity, but the second type of particle having higher electrophoretic mobility than the third type of particle, the medium having a magnet disposed adjacent its first surface;

(b) applying to the medium an electric field having a polarity which causes the second and third types of particles to move adjacent the second surface of the medium with the second type of particles lying closer to the second surface, so that the second optical characteristic is visible at the second surface, the first type of particles lying adjacent the first surface of the medium;

(c) applying to the medium an electric field having a polarity and magnitude sufficient to cause the second and third types of particles to move adjacent the first surface of the display, with the third type of particles lying closer to the second surface, the magnitude of the electric field being insufficient to cause the first type of particles to move away from the first surface of the medium against the magnetic forces acting on the first type of particles, thereby causing the third optical characteristic to be visible at the second surface; and (d) applying to the medium an electric field having a polarity and magnitude sufficient to cause the second and third types of particles to move adjacent the first surface of the medium, the magnitude of the electric field being sufficient to cause the first type of particles to move away from the first surface of the medium against the magnetic forces acting on the first type of particles and lie adjacent the second surface of the medium, thereby causing the first optical characteristic to be visible at the second surface.

Finally, this invention also provides a fifth method of addressing an electrophoretic medium, to provide a threshold and/or to increase the number of optical states which can be displayed by the medium, the method comprising:

providing an electrophoretic medium having opposed first and second surfaces, the medium comprising a suspending fluid having a first optical characteristic, and a plurality of electrically charged magnetic particles suspended in the suspending fluid, the medium having a magnet disposed adjacent its first surface;

applying to the medium an electric field having a polarity and magnitude which tends to cause the particles to move towards the second surface of the medium but which is insufficient to overcome the magnetic forces applied to the particles by the magnet, thereby the particles to remain adjacent the first surface of the medium; and applying to the medium an electric field having a polarity and magnitude sufficient to cause the particles to move through the suspending fluid against the magnetic forces applied to the particles by the magnet, thereby causing the particles to move adjacent the second surface of the medium, the optical state of the medium varying depending upon whether the particles are adjacent the first or second surface of the medium.

Although other magnetic particles may be employed, the preferred magnetic material for use in the media and displays of the present invention is iron tetroxide ($Fe_3O_4$), usually known as "magnetite" or "lodestone", the most common mineral forms of this material. This material is inexpensive and can readily be reduced to the particle size range (about 0.25 to 5 $\mu$m) required for use in electrophoretic displays. In all the embodiments of the present invention, it is preferred that at least the magnetic particles bear a polymer coating, this polymer coating preferably being formed by one of the processes described in copending Application Serial No. 60/291,061 filed May 15, 2001; the entire contents of this copending application are herein incorporated by reference. It has been found difficult to produce, in the hydrocarbon-based suspending fluids typically used in electrophoretic media, a dispersion of magnetite particles which is stable for a sufficiently long period to be commercially useful unless the magnetite is polymer coated. Indeed, it is preferred that all the particles in the present media bear polymer coatings produced as described in this copending application, since such coatings are useful in increasing the stability of electrophoretic media containing particles bearing charges of opposite polarity.

Magnetite itself is of course black in color. In many embodiments of the invention, the magnetite may be used in this black form. However, in other cases, magnetic particles of other colors may be desired, and in such cases the magnetic particles may comprise magnetite coated with another pigment. For example, if white magnetic particles are desired, magnetite could be coated with titania by conventional processes such as those used commercially to coat titania on to mica. More generally, the magnetic particles used in the present invention may comprise a core of magnetic material and a shell of non-magnetic material substantially completely surrounding the core; the shell may itself bear a polymer coating or other surface treatment.

BRIEF DESCRIPTION OF DRAWINGS

Preferred embodiments of the present invention will now be described, though by way of illustration only, with reference to the accompanying drawings, in which.

DETAILED DESCRIPTION

Figure 1A:
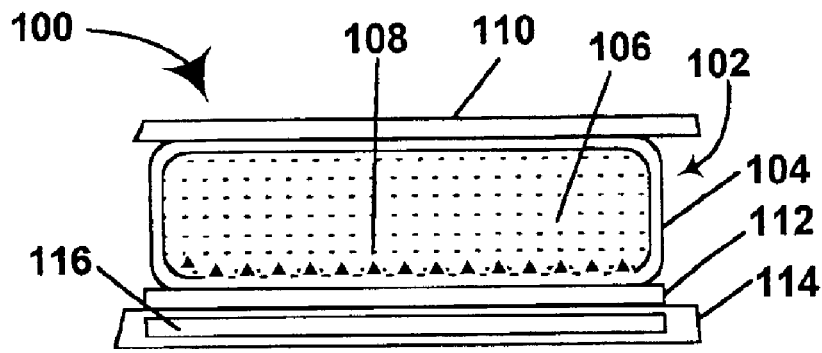
FIGS. 1A–1C are schematic side elevations showing various states of a first electrophoretic display of the present invention, in which the electrophoretic medium comprises a single type of particle, which is both magnetic and electrophoretically mobile, in a colored suspending liquid.
Figure 1B:
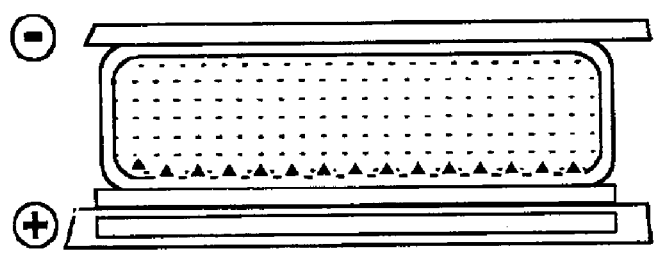
Figure 1C:
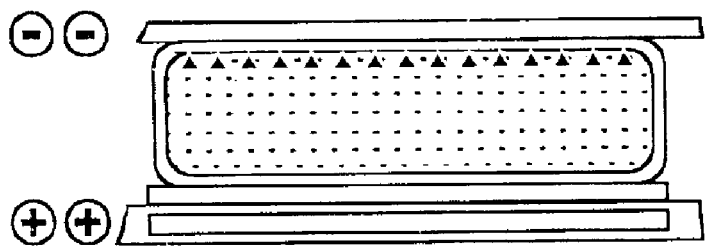

The first electrophoretic display (generally designated 100) of the invention shown in FIGS. 1A–1C comprises an encapsulated electrophoretic medium (generally designated 102) comprising a plurality of capsules 104 (only one of which is shown in FIGS 1A–1C), each of which contains a suspending liquid 106 and dispersed therein a plurality of a single type of particle 108, which for purposes of illustration will be assumed to be black. The particles 108 are both magnetic and electrophoretically mobile and are preferably formed of magnetite. In the following description, it will be assumed that the particles 108 are positively charged, although of course negatively charged particles could also be used if desired. (The triangular shape of the particles 108, and the square and circular shapes of other particles discussed below, are used purely by way of illustration to enable the various types of particles to be distinguished easily in the accompanying drawings, and in no way correspond to the physical forms of the actual particles, which are typically substantially spherical. It should be stressed that, unlike some prior art magnetophoretic displays, in which particles are moved magnetically but not electrostatically, the present displays normally do not rely upon the contrast between face-on and edge-on views of flat, flake-like magnetic particles, and will operate satisfactorily with substantially spherical particles. However, we do not exclude the use of non-spherical particles in the present displays.)

The display 100 further comprises a common, transparent front electrode 110, which forms a viewing surface through which an observer views the display 100, and a plurality of discrete rear electrodes 112, each of which defines one pixel of the display 100 (only one rear electrode 112 is shown in FIGS. 1A–1C). For ease of illustration and comprehension, FIGS. 1A–1C show only a single microcapsule forming the pixel defined by rear electrode 112, although in practice a large number (20 or more) microcapsules are normally used for each pixel. The rear electrodes 112 are mounted upon a substrate 114, which contains a magnetic sheet 116, which may be formed from any convenient magnetic material, for example bonded ferrite, ceramic hard ferrite, aluminum-nickel-cobalt alloys (Alnico), or a rare earth magnetic material, such as samarium cobalt or neodymium iron boron. The magnetic material should have north and south poles alternating transversely across the width of the magnetic sheet 116, with poling widths less than about 500 $\mu$m. Preferably the poling widths should be half the width of the capsules in the electrophoretic medium. Such magnets may be purchased from Group Arnold (300 N. West St., Marengo, Ill., 60152—Group Arnold is a Registered Trademark). For reasons explained below, the magnetic sheet 116 should lie adjacent the rear electrodes 112 but does not need to be incorporated into the substrate 114; for example, the magnetic sheet 116 could lie between the rear electrodes 112 and the substrate 114, or on the opposed side of the substrate 114 from the rear electrodes 112.

The suspending liquid 106 is colored such that the particles 108 lying in the positions shown in FIG. 1A adjacent the rear electrodes 112 are not visible to an observer viewing the display 100 via the front electrode 110. Since the colored suspending liquid 106 and the particles 108 render the electrophoretic medium 102 opaque, the rear electrodes 112 and the substrate 114 can be transparent or opaque since they are not visible through the opaque electrophoretic medium 102.

The capsules 104 and the particles 108 can be made in a wide range of sizes. However, in general it is preferred that the thickness of the capsules, measured perpendicular to the electrodes, be in the range of about 15 to 500 $\mu$m, while the particles 108 will typically have diameters in the range of about 0.25 to about 2 $\mu$m.

FIG. 1A shows the display 100 with no charges on the electrodes 110 and 112. Under this condition, the magnetic particles 108 are attracted to the magnetic sheet 116 and thus lie adjacent the rear electrode 112, where they are hidden from an observer viewing the display 100 through the front electrode 110 by the colored liquid 106. Accordingly, the pixel shown in FIG. 1A displays to the observer the color of the liquid 106, which for purposes of illustration will be assumed to be white. Obviously, since the particles 108 are assumed to be positively charged, this white state of the pixel will not change if the rear electrode 112 is negatively charged relative to the front electrode 110, since under such conditions the particles 108 will be held against the rear electrode 112 by both magnetic and electrostatic forces. (Although the display 100 is illustrated in FIGS. 1A–1C with the rear electrodes 112 at the bottom, in practice both the front and rear electrodes are typically disposed vertically for maximum visibility of the display 100. None of the preferred displays described herein rely in any way upon gravity to control the movement of the particles; such movement under gravity is in practice far too slow to be useful for controlling particle movement.)

FIG. 1B shows the display 100 with the front electrode 110 made slightly negative relative to the rear electrode 112, as indicated by the single negative sign adjacent the front electrode 110. Since the particles 108 are positively charged, they will be weakly attracted to the slightly negatively charged front electrode 110, but in the situation shown in FIG. 1B, this weak electrostatic attraction is insufficient to overcome the magnetic attraction of the particles 108 to the magnetic sheet 116. Accordingly, the particles 108 remain adjacent the rear electrode 112 and the pixel continues to display the white color of the liquid 106.

FIG. 1C shows the display 100 with the front electrode 110 made highly negative relative to the rear electrode 112, as indicated by the double negative sign adjacent the front electrode 110. The positively charged particles 108 are now strongly electrostatically attracted to the highly negative front electrode 110, and this strong electrostatic attraction is sufficient to overcome the magnetic attraction of the particles 108 to the magnetic sheet 116. Accordingly, the particles 108 move adjacent the front electrode 110, and the pixel displays the black color of the particles 108.

Thus, the provision of the magnetic particles 108 and the magnetic sheet in the display 100 provides a switching threshold for the display; the illustrated pixel of the display does not switch when the front electrode 110 is made slightly negative relative to the rear electrode 112, but does switch when the front electrode 110 is made highly negative relative to the rear electrode 112. Thus, the display 100 could be addressed by passive matrix techniques.

In FIGS. 1A–1C, the capsules 104 are illustrated as being of substantially prismatic form, having a width (parallel to the planes of the electrodes) significantly greater than their height (perpendicular to these planes). This prismatic shape of the capsules 104 is deliberate. If the capsules 104 were essentially spherical, in the black state shown in FIG. 1C, the particles 108 would tend to gather in the highest part of the capsule, in a limited area centered directly above the center of the capsule. The color seen by the observer would then be essentially the average of this central black area and a white annulus surrounding this central area, where the white liquid 106 would be visible. Thus, even in this supposedly black state, the observer would see a grayish color rather than a pure black, and the contrast between the two extreme optical states of the pixel would be correspondingly limited. In contrast, with the prismatic form of microcapsule shown in FIG. 1C, the particles 108 cover essentially the entire cross-section of the capsule so that no, or at least very little white liquid is visible, and the contrast between the extreme optical states of the capsule is enhanced. For further discussion on this point, and on the desirability of achieving close-packing of the capsules within the electrophoretic layer, the reader is referred to the aforementioned U.S. Pat. No. 6,067,185, and the corresponding published International Application WO 99/10767.

Figure 2A:
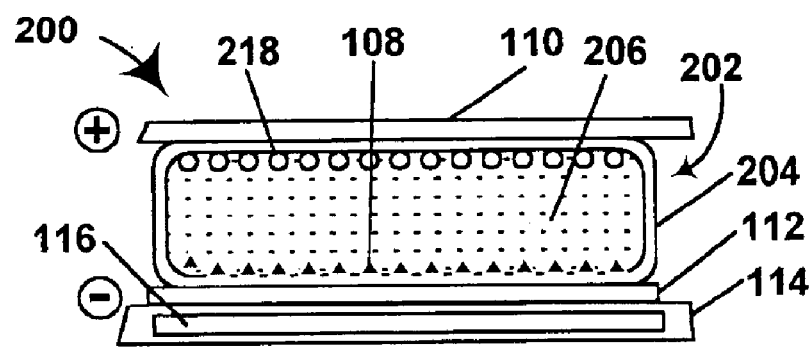
FIGS. 2A–2C are schematic side elevations showing various states of a second electrophoretic display of the present invention, in which the electrophoretic medium comprises one type of particle which is magnetic and electrophoretically mobile, bearing a charge of one polarity, and a second type of particle which is non-magnetic but is electrophoretically mobile, bearing a charge of opposite polarity to the first type of particle.
Figure 2B:
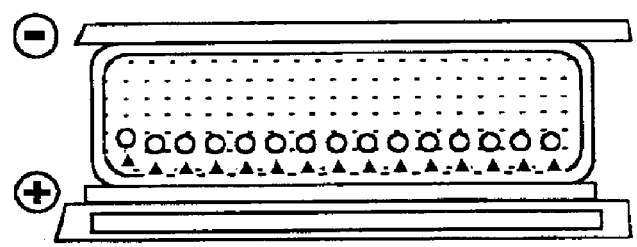
Figure 2C:
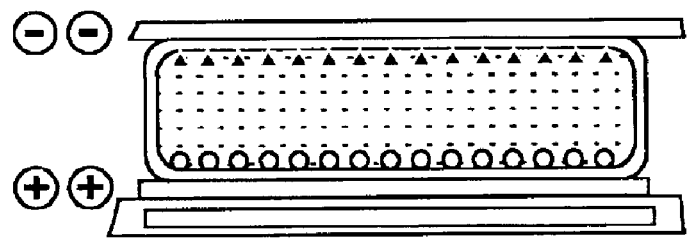

The second electrophoretic display (generally designed 200) of the invention shown in FIGS. 2A–2C comprises an encapsulated electrophoretic medium (generally designated 202) comprising a plurality of capsules 204, each of which contains a suspending liquid 206 and dispersed therein a plurality of magnetic, positively charged black particles 108 identical discussed to those in the first display 100 discussed above. The display 200 further comprises a front electrode 110, rear electrodes 112, a substrate 114 and a magnetic sheet 116, all of which are identical to the corresponding integers in the first display 100. However, in addition to the black particles 108, there are suspended in the liquid 206 a plurality of negatively charged, non-magnetic particles 218.

There are two variants of the display 200 depending upon whether the liquid 206 is uncolored or colored. First, assume that the liquid 206 is uncolored (i.e., essentially transparent although as mentioned earlier, some coloration of the liquid 206 may be used to adjust the colors displayed) and the particles 218 are white. FIG. 2A shows the display 200 with the front electrode 110 positively charged relative to the rear electrode 112 of the illustrated pixel; in this polarity, the size of the potential difference between the electrodes is essentially irrelevant. The positively charged particles 108 are held adjacent the rear electrode 112 by both magnetic and electrostatic forces, while the negatively charged particles 218 are held electrostatically against the front electrode 110. Accordingly, an observer viewing the display 200 through the front electrode 110 sees a white pixel, since the white particles 218 are visible and hide the black particles 108.

FIG. 2B shows the display 200 with the front electrode 110 slightly negatively charged relative to the rear electrode 112 of the illustrated pixel. As in the corresponding situation shown in FIG. 1B, the positive charged particles 108 will be weakly attracted to the negatively charged front electrode 110, but this weak electrostatic attraction is insufficient to overcome the magnetic attraction of the particles 108 to the magnetic sheet 116. Accordingly, the particles 108 remain adjacent the rear electrode 112. The particles 218, which are subject to electrostatic but not magnetic forces, move towards the rear electrode 112 and (provided a sufficient number of particles 218 are present, which is easy to arrange in practice) these white particles 218 form a continuous white layer overlying and hiding the layer of black particles 108. Accordingly, an observer viewing the display 200 through the front electrode 110 still sees a white pixel, since the white particles 218 are visible through the uncolored liquid 206 and hide the black particles 108.

Finally, FIG. 2C shows the display 200 with the front electrode 110 highly negatively charged relative to the rear electrode 112 of the illustrated pixel. As in the corresponding optical state shown in FIG. 1C, the positively charged particles 108 are now strongly electrostatically attracted to the highly negative front electrode 110, and this strong electrostatic attraction is sufficient to overcome the magnetic attraction of the particles 108 to the magnetic sheet 116. Accordingly, the particles 108 move adjacent the front electrode 110, and the pixel displays the black color of the particles 108, which hide the white particles 218.

Thus, as with the first display of the invention, in the second display 200, the provision of the magnetic particles 108 and the magnetic sheet 216 provides a switching threshold for the display; the illustrated pixel of the display does not switch when the front electrode 110 is made slightly negative relative to the rear electrode 112, but does switch when the front electrode 110 is made highly negative relative to the rear electrode 112. Thus, the display 200 could be addressed by passive matrix techniques.

As already mentioned, there is a second variant of the display 200 shown in FIGS. 2A–2C which uses a colored suspending liquid 206; as previously described, coloration of the liquid 206 may be achieved by dissolving a dye in the liquid or by providing a nanoparticle pigment suspension in the liquid. For purposes of illustration, suppose that in the second variant, the particles 108 are again black, the particles 218 are again white, but that the suspending liquid 206 is colored; this color will be assumed to be red for purposes of illustration. Obviously, in this second variant the movement of the particles are exactly the same as in the first variant, so that the situation shown in FIG. 2A displays a white pixel and the optical state shown in FIG. 2C displays a black pixel. However, with the red liquid 206, in the optical state shown in FIG. 2B, the observer sees the red color of the liquid 206, but not the white color of the particles 218 nor the black color of the particles 108, since both sets of particles are hidden by the red liquid 206. Accordingly, in FIG. 2B, the observer sees a red pixel, so that this variant provides a three-color pixel.

Figure 3A:
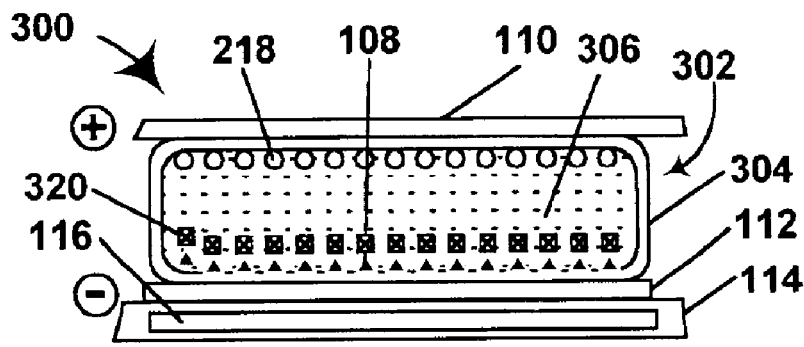
FIGS. 3A–3C are schematic side elevations showing various states of a third electrophoretic display of the present invention, in which the electrophoretic medium comprises one type of particle which is magnetic and electrophoretically mobile, bearing a charge of one polarity, a second type of particle which is non-magnetic but is electrophoretically mobile, bearing a charge of opposite polarity to the first type of particle, and a third type of particle which is non-magnetic but is electrophoretically mobile, bearing a charge of the same polarity as the first type of particle.
Figure 3B:
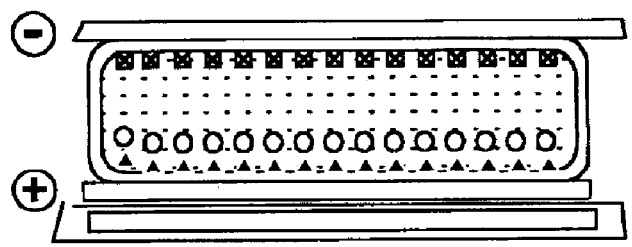
Figure 3C:
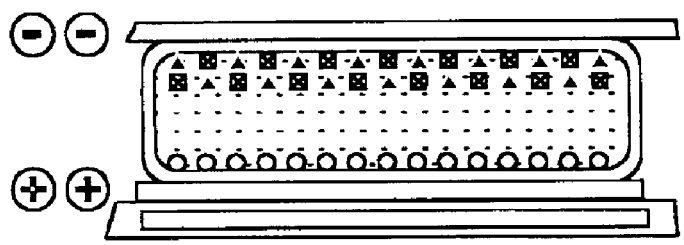

The third electrophoretic display (generally designed 300) of the invention shown in FIGS. 3A–3C comprises an encapsulated electrophoretic medium (generally designated 302) comprising a plurality of capsules 304, each of which contains an uncolored suspending liquid 306 and dispersed therein a plurality of magnetic, positively charged black particles 108 and a plurality of non-magnetic, negatively charged white particles 218, both sets of particles being identical to those in the second display 200 discussed above. The display 300 further comprises a front electrode 110, rear electrodes 112, a substrate 114 and a magnetic sheet 116, all of which are identical to the corresponding integers in the first and second displays 100 and 200 respectively. However, in addition to the particles 108 and 218, there are suspended in the liquid 306 a plurality of positively charged, non-magnetic particles 320, which differ in color from both sets of particles 108 and 218, and which for purposes of illustration will be assumed to be red.

FIG. 3A shows the display 300 with the front electrode 110 positively charged relative to the rear electrode 112 of the illustrated pixel; in this polarity, the size of the potential difference between the electrodes is essentially irrelevant. As in the corresponding optical state shown in FIG. 2A, the positively charged particles 108 are held adjacent the rear electrode 112 by both magnetic and electrostatic forces, while the negatively charged particles 218 are held electrostatically against the front electrode 110. The non-magnetic positively charged particles 320 are held against the rear electrode 112 by electrostatic forces only. Accordingly, an observer viewing the display 300 through the front electrode 110 sees a white pixel, since the white particles 218 are visible and hide both the black particles 108 and the red particles 320. (Note that in this display state, it does not matter whether the black particles 108 and the red particles 320 form two separate layers, as illustrated in FIG. 3A, or the reverse situation with the red particles 320 closer to the rear electrode 112, or the two types of particles are intermingled in a single layer, since in all cases both the black particles 108 and the red particles 320 are hidden by the white particles 108.

FIG. 3B shows the display 300 with the front electrode 110 slightly negatively charged relative to the rear electrode 112 of the illustrated pixel. As in the corresponding optical state shown in FIG. 2B, the positive charged particles 108 will be weakly attracted to the negatively charged front electrode 110, but this weak electrostatic attraction is insufficient to overcome the magnetic attraction of the particles 108 to the magnetic sheet 116. Accordingly, the particles 108 remain adjacent the rear electrode 112. The negatively charged particles 218 move adjacent the rear electrode 112, while the red positively charged particles 320 move adjacent the front electrode 110. Accordingly, an observer viewing the display 300 through the front electrode 110 sees a red pixel, since the red particles 320 adjacent the front electrode 110 are visible and hide the black particles 108 and the white particles 218. (As in the optical state shown in FIG. 3A, in the optical state shown in FIG. 3B, it makes no visible difference whether the black particles 108 and the white particles 218 form two separate layers or are intermingled in a single layer.)

Finally, FIG. 3C shows the display 300 with the front electrode 110 highly negatively charged relative to the rear electrode 112 of the illustrated pixel. As in the corresponding optical state shown in FIG. 2C, the positively charged particles 108 are now strongly electrostatically attracted to the highly negative front electrode 110, and this strong electrostatic attraction is sufficient to overcome the magnetic attraction of the particles 108 to the magnetic sheet 116. Accordingly, the particles 108 move adjacent the front electrode 110. The positively charged particles 320 will also move adjacent the front electrode 110, while the negatively charged particles 218 will move adjacent the rear electrode 112.

The exact appearance of the pixel in FIG. 3C depends upon the population of black particles 108 and red particles 320 immediately adjacent the front electrode 110, since these are the only particles visible to an observer viewing the display through this electrode. In practice, despite the way in which FIGS. 3A–3C are drawn for purposes of illustration, it is not advisable to generate the optical state shown in FIG. 3C from that shown in FIG. 3B, since in this case the red particles already present adjacent the front electrode 110 will tend to block access of the black particles and the pixel shown in FIG. 3 will appear essentially red. Instead, the display state shown in FIG. 3C should be generated by abruptly reversing polarity on the electrodes in the state shown in FIG. 3A, so that the black particles 108 and red particles 320 move together from adjacent the rear electrode 112 to adjacent the front electrode and form a mixed layer of black and red particles, as illustrated in FIG. 3C. The resultant mixture of black and red particles immediately adjacent the front electrode 110 will present a dark, essentially black appearance to the observer. In a preferred form of this third embodiment, the black particles 108 have a substantially higher electrophoretic mobility than the red particles 320 so that when the polarity of the electrodes in the optical state shown in FIG. 3A is abruptly reversed, the black particles 108 move more swiftly than the red particles 320 towards the front electrode 110, so that the final layer of particles immediately adjacent this electrode is predominantly if not exclusively comprised of black particles, and thus the pixel displays a true black color to the observer. The black particles 108 and the red particles 320 of course hide the white particles 218 from the observer.

Figure 4A:
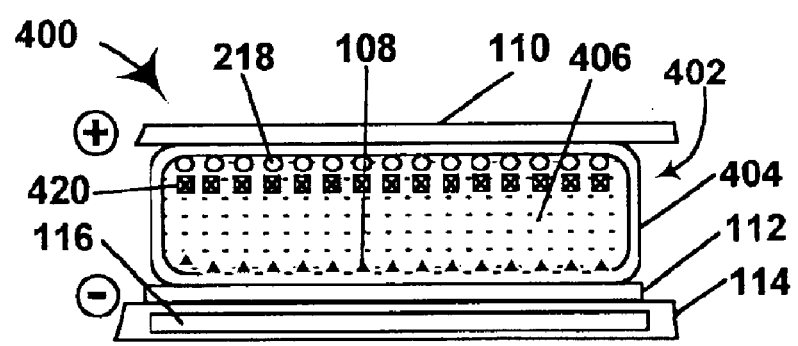
FIGS. 4A–4C are schematic side elevations showing various states of a fourth electrophoretic display of the present invention, in which the electrophoretic medium comprises one type of particle which is magnetic and electrophoretically mobile, bearing a charge of one polarity, and second and third types of particle which are non-magnetic but are electrophoretically mobile, both the second and third types of particles bearing a charge of opposite polarity to the first type of particle, the second and third types of particles differing from each other in electrophoretic mobility.
Figure 4B:
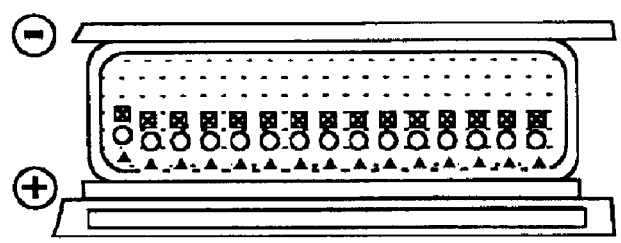
Figure 4C:
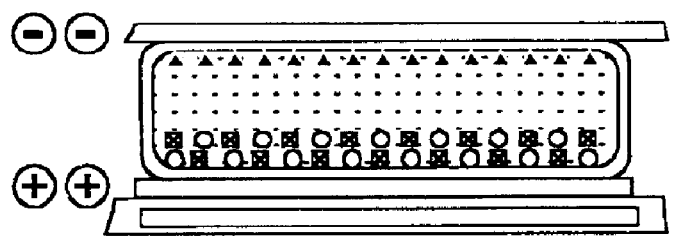

The fourth electrophoretic display (generally designed 400) of the invention shown in FIGS. 4A–4C comprises an encapsulated electrophoretic medium (generally designated 402) comprising a plurality of capsules 404. The display 400 further comprises a front electrode 110, rear electrodes 112, a substrate 114 and a magnetic sheet 116, all of which are identical to the corresponding integers in the three displays 100, 200 and 300 previously described. The display 400 closely resembles the display 300 described above in that the liquid 406 is uncolored and in that black positively charged magnetic particles 108 and white negatively charged non-magnetic particles 218 are suspended therein. However the display 400 differs from the display 300 in that the red positively charged non-magnetic particles 320 are replaced by red negatively charged non-magnetic particles 420, which have a substantially lower electrophoretic mobility than the white particles 218.

FIG. 4A shows the display 400 with the front electrode 110 positively charged relative to the rear electrode 112 of the illustrated pixel; in this polarity, the size of the potential difference between the electrodes is essentially irrelevant. As in the corresponding optical states shown in FIGS. 2A and 3A, the positively charged particles 108 are held adjacent the rear electrode 112 by both magnetic and electrostatic forces. Both the negatively charged white particles 218 and the negatively charged red particles 420 are attracted to the front electrode 110, but since the white particles 218 have substantially higher electrophoretic mobility, they reach the front electrode 110 first (note that the optical state shown in FIG. 4A is normally generated by abruptly reversing the polarity of the electrodes in either of the optical states shown in FIGS. 4B and 4C, thus forcing both the white particles 218 and the red particles 420 to traverse the thickness of the capsule 404, and thus allowing the greater mobility of the white particles 218 to cause them to reach their positions adjacent the front electrode 110 before the red particles 420). Thus, the white particles 218 form a continuous layer immediately adjacent the front electrode 110, thereby hiding both the red particles 420 and the black particles 108. Accordingly, an observer viewing the display 400 through the front electrode 110 sees a white pixel, since the white particles 218 are visible and hide both the black particles 108 and the red particles 420.

FIG. 4B shows the display 400 with the front electrode 110 slightly negatively charged relative to the rear electrode 112 of the illustrated pixel. As in the corresponding optical states shown in FIGS. 2B and 3B, the positively charged particles 108 will be weakly attracted to the negatively charged front electrode 110, but this weak electrostatic attraction is insufficient to overcome the magnetic attraction of the particles 108 to the magnetic sheet 116. Accordingly, the particles 108 remain adjacent the rear electrode 112. Both the negatively charged white particles 218 and the negatively charged red particles 420 are attracted to the rear electrode 112, but since the white particles have higher electrophoretic mobility, when the optical state shown in FIG. 4B is produced by reversing the polarity on the electrodes in the optical state shown in FIG. 4A, the white particles 218 reach the rear electrode 112 more quickly than do the red particles 420, so that the white particles 218 form a continuous layer of particles overlying the black particles 108, and leaving a continuous layer of the red particles 420 facing the front electrode 110. Accordingly, an observer viewing the display 400 through the front electrode 110 sees a red pixel, since the red particles 420 are visible and hide the black particles 108 and the white particles 218.

Finally, FIG. 4C shows the display 400 with the front electrode 110 highly negatively charged relative to the rear electrode 112 of the illustrated pixel. As in the corresponding optical states shown in FIGS. 2C and 3C, the positively charged particles 108 are now strongly electrostatically attracted to the highly negative front electrode 110, and this strong electrostatic attraction is sufficient to overcome the magnetic attraction of the particles 108 to the magnetic sheet 116. Accordingly, the particles 108 move adjacent the front electrode 110. The negatively charged red particles 420 and the negatively charged white particles 218 remain adjacent the rear electrode 112 (it makes no visible difference whether the red particles 420 and the white particles 218 form two separate layers or intermingle in a single layer). Accordingly, an observer viewing the display 400 through the front electrode 110 sees a black pixel, since the black particles 108 are visible and hide the red particles 420 and the white particles 218.

Apart from the provision of the magnetic particles, the electrophoretic media and displays of the present invention may employ the same components and manufacturing techniques as in the aforementioned Massachusetts Institute of Technology and E Ink Corporation patents and applications. In view of the numerous different materials and manufacturing techniques which can be employed in such electrophoretic displays, the following Sections A–E are given by way of general guidance.

A. Electrophoretic Particles

There is much flexibility in the choice of particles for use in electrophoretic displays, as described above. For purposes of this invention, a particle is any component that is charged or capable of acquiring a charge (i.e., has or is capable of acquiring electrophoretic mobility), and, in some cases, this mobility may be zero or close to zero (i.e., the particles will not move). The particles may be neat pigments, dyed (laked) pigments or pigment/polymer composites, or any other component that is charged or capable of acquiring a charge. Typical considerations for the electrophoretic particle are its optical properties, electrical properties, and surface chemistry. The particles may be organic or inorganic compounds, and they may either absorb light or scatter light. The particles for use in the invention may further include scattering pigments, absorbing pigments and luminescent particles. The particles may be retroreflective, such as corner cubes, or they may be electroluminescent, such as zinc sulfide particles, which emit light when excited by an AC field, or they may be photoluminescent. Zinc sulfide electroluminescent particles may be encapsulated with an insulative coating to reduce electrical conduction. Finally, the particles may be surface treated so as to improve charging or interaction with a charging agent, or to improve dispersability.

One particle for use in electrophoretic displays of the invention is titania. The titania particles may be coated with a metal oxide, such as aluminum oxide or silicon oxide, for example. The titania particles may have one, two, or more layers of metal-oxide coating. For example, a titania particle for use in electrophoretic displays of the invention may have a coating of aluminum oxide and a coating of silicon oxide. The coatings may be added to the particle in any order.

The electrophoretic particle is usually a pigment, a polymer, a laked pigment, or some combination of the above. A neat pigment can be any pigment, and, usually for a light colored particle, pigments such as rutile (titania), anatase (titania), barium sulfate, kaolin, or zinc oxide are useful. Some typical particles have high refractive indices, high scattering coefficients, and low absorption coefficients. Other particles are absorptive, such as carbon black or colored pigments used in paints and inks. The pigment should also be insoluble in the suspending fluid. Yellow pigments such as diarylide yellow, Hansa yellow, and benzidin yellow have also found use in similar displays. Any other reflective material can be employed for a light colored particle, including non-pigment materials, such as metallic particles.

Useful neat pigments include, but are not limited to, $PbCrO_4$, Cyan blue GT 55-3295 (American Cyanamid Company, Wayne, N.J.), Cibacron Black BG (Ciba Company, Inc., Newport, Del.), Cibacron Turquoise Blue G (Ciba), Cibalon Black BGL (Ciba), Orasol Black BRG (Ciba), Orasol Black RBL (Ciba), Acetamine Black, CBS (E. I. du Pont de Nemours and Company, Inc., Wilmington, Del., hereinafter abbreviated "du Pont"), Crocein Scarlet N Ex (du Pont) (27290), Fiber Black VF (du Pont) (30235), Luxol Fast Black L (du Pont) (Solv. Black 17), Nirosine Base No. 424 (du Pont) (50415 B), Oil Black BG (du Pont) (Solv. Black 16), Rotalin Black RM (du Pont), Sevron Brilliant Red 3 B (du Pont); Basic Black DSC (Dye Specialties, Inc.), Hectolene Black (Dye Specialties, Inc.), Azosol Brilliant Blue B (GAF, Dyestuff and Chemical Division, Wayne, N.J.) (Solv. Blue 9), Azosol Brilliant Green BA (GAF) (Solv. Green 2), Azosol Fast Brilliant Red B (GAF), Azosol Fast Orange RA Conc. (GAF) (Solv. Orange 20), Azosol Fast Yellow GRA Conc. (GAF) (13900 A), Basic Black KMPA (GAF), Benzofix Black CW-CF (GAF) (35435), Cellitazol BNFV Ex Soluble CF (GAF) (Disp. Black 9), Celliton Fast Blue AF Ex Conc (GAF)

(Disp. Blue 9), Cyper Black IA (GAF) (Basic Black 3), Diamine Black CAP Ex Conc (GAF) (30235), Diamond Black EAN Hi Con. CF (GAF) (15710), Diamond Black PBBA Ex (GAF) (16505); Direct Deep Black EA Ex CF (GAF) (30235), Hansa Yellow G (GAF) (11680); Indanthrene Black BBK Powd. (GAF) (59850), Indocarbon CLGS Conc. CF (GAF) (53295), Katigen Deep Black NND Hi Conc. CF (GAF) (15711), Rapidogen Black 3 G (GAF) (Azoic Black 4); Sulphone Cyanine Black BA-CF (GAF) (26370), Zambezi Black VD Ex Conc. (GAF) (30015); Rubanox Red CP-1495 (The Sherwin-Williams Company, Cleveland, Ohio.) (15630); Raven 11 (Columbian Carbon Company, Atlanta, Ga.), (carbon black aggregates with a particle size of about 25 $\mu$m), Statex B-12 (Columbian Carbon Co.) (a furnace black of 33 $\mu$m average particle size), Greens 223 and 425 (The Shepherd Color Company, Cincinnati, Ohio. 45246); Blacks 1, 1 G and 430 (Shepherd); Yellow 14 (Shepherd); Krolor Yellow KO-788-D (Dominion Colour Corporation, North York, Ontario; "KROLOR" is a Registered Trade Mark); Red Synthetic 930 and 944 (Alabama Pigments Co., Green Pond, Ala. 35074), Krolor Oranges KO-786-D and KO-906-D (Dominion Colour Corporation); Green GX (Bayer); Green 56 (Bayer); Light Blue ZR (Bayer); Fast Black 100 (Bayer); Black 444 (Shepherd); Light Blue 100 (Bayer); Light Blue 46 (Bayer); Yellow 6000 (First Color Co., Ltd., 1236-1, Jwungwang-dong, Shihung, Kyounggi-do, Korea), Blues 214 and 385 (Shepherd); Violet 92 (Shepherd); and chrome green.

Particles may also include laked, or dyed, pigments. Laked pigments are particles that have a dye precipitated on them or which are stained. Lakes are metal salts of readily soluble anionic dyes. These are dyes of azo, triphenylmethane or anthraquinone structure containing one or more sulphonic or carboxylic acid groupings. They are usually precipitated by a calcium, barium or aluminum salt onto a substrate. Typical examples are peacock blue lake (Cl Pigment Blue 24) and Persian orange (lake of Cl Acid Orange 7), Black M Toner (GAF) (a mixture of carbon black and black dye precipitated on a lake).

A dark particle of the dyed type may be constructed from any light absorbing material, such as carbon black, or inorganic black materials. The dark material may also be selectively absorbing. For example, a dark green pigment may be used. Black particles may also be formed by staining latices with metal oxides, such latex copolymers consisting of any of butadiene, styrene, isoprene, methacrylic acid, methyl methacrylate, acrylonitrile, vinyl chloride, acrylic acid, sodium styrene sulfonate, vinyl acetate, chlorostyrene, dimethylaminopropylmethacrylamide, isocyanoethyl methacrylate and N-(isobutoxymethacrylamide), and optionally including conjugated diene compounds such as diacrylate, triacrylate, dimethylacrylate and trimethacrylate. Black particles may also be formed by a dispersion polymerization technique.

In the systems containing pigments and polymers, the pigments and polymers may form multiple domains within the electrophoretic particle, or be aggregates of smaller pigment/polymer combined particles. Alternatively, a central pigment core may be surrounded by a polymer shell. The pigment, polymer, or both can contain a dye. The optical purpose of the particle may be to scatter light, absorb light, or both. Useful sizes may range from 1 nm up to about 100 $\mu$m, as long as the particles are smaller than the bounding capsule. The density of the electrophoretic particle may be substantially matched to that of the suspending (i.e., electrophoretic) fluid. As defined herein, a suspending fluid has a density that is "substantially matched" to the density of the particle if the difference in their respective densities is between about zero and about two grams/milliliter ("g/ml"). This difference is preferably between about zero and about 0.5 g/ml.

Useful polymers for the particles include, but are not limited to: polystyrene, polyethylene, polypropylene, phenolic resins, du Pont Elvax resins (ethylene-vinyl acetate copolymers), polyesters, polyacrylates, polymethacrylates, ethylene acrylic acid or methacrylic acid copolymers (Nucrel Resins du Pont, Primacor Resins Dow Chemical), acrylic copolymers and terpolymers (Elvacite Resins du Pont) and PMMA. Useful materials for homopolymer/pigment phase separation in high shear melt include, but are not limited to, polyethylene, polypropylene, poly(methyl methacrylate), poly(isobutyl methacrylate), polystyrene, polybutadiene, polyisoprene, polyisobutylene, poly(lauryl methacrylate), poly(stearyl methacrylate), poly(isobornyl methacrylate), poly(t-butyl methacrylate), poly(ethyl methacrylate), poly(methyl acrylate), poly(ethyl acrylate), polyacrylonitrile, and copolymers of two or more of these materials. Some useful pigment/polymer complexes that are commercially available include, but are not limited to, Process Magenta PM 1776 (Magruder Color Company, Inc., Elizabeth, N.J.), Methyl Violet PMA VM6223 (Magruder Color Company, Inc., Elizabeth, N.J.), and Naphthol FGR RF6257 (Magruder Color Company, Inc., Elizabeth, N.J.).

The pigment-polymer composite may be formed by a physical process, (e.g., attrition or ball milling), a chemical process (e.g., microencapsulation or dispersion polymerization), or any other process known in the art of particle production. For example, the processes and materials for both the fabrication of liquid toner particles and the charging of those particles may be relevant.

New and useful electrophoretic particles may still be discovered, but a number of particles already known to those skilled in the art of electrophoretic displays and liquid toners can also prove useful. In general, the polymer requirements for liquid toners and encapsulated electrophoretic inks are similar, in that the pigment or dye must be easily incorporated therein, either by a physical, chemical, or physicochemical process, may aid in the colloidal stability, and may contain charging sites or may be able to incorporate materials which contain charging sites. One general requirement from the liquid toner industry that is not shared by encapsulated electrophoretic inks is that the toner must be capable of "fixing" the image, i.e., heat fusing together to create a uniform film after the deposition of the toner particles.

Typical manufacturing techniques for particles may be drawn from the liquid toner and other arts and include ball milling, attrition, jet milling, etc. The process will be illustrated for the case of a pigmented polymeric particle. In such a case the pigment is compounded in the polymer, usually in some kind of high shear mechanism such as a screw extruder. The composite material is then (wet or dry) ground to a starting size of around 10 $\mu$m. It is then dispersed in a carrier liquid, for example ISOPAR® (Exxon, Houston, Tex.), optionally with some charge control agent(s), and milled under high shear for several hours down to a final particle size and/or size distribution.

Another manufacturing technique for particles is to add the polymer, pigment, and suspending fluid to a media mill. The mill is started and simultaneously heated to a temperature at which the polymer swells substantially with the solvent. This temperature is typically near 100° C. In this state, the pigment is easily encapsulated into the swollen polymer. After a suitable time, typically a few hours, the mill is gradually cooled back to ambient temperature while stirring. The milling may be continued for some time to achieve a small enough particle size, typically a few microns in diameter. The charging agents may be added at this time. Optionally, more suspending fluid may be added.

Chemical processes such as dispersion polymerization, mini- or micro-emulsion polymerization, suspension polymerization precipitation, phase separation, solvent evaporation, in situ polymerization, seeded emulsion polymerization, or any process which falls under the general category of microencapsulation may be used. A typical process of this type is a phase separation process wherein a dissolved polymeric material is precipitated out of solution onto a dispersed pigment surface through solvent dilution, evaporation, or a thermal change. Other processes include chemical means for staining polymeric latices, for example with metal oxides or dyes.

B. Suspending Fluid

The suspending fluid containing the particles can be chosen based on properties such as density, refractive index, and solubility. A preferred suspending fluid has a low dielectric constant (about 2), high volume resistivity (about $10^{15}$ ohm-cm), low viscosity (less than 5 centistokes ("cst")), low toxicity and environmental impact, low water solubility (less than 10 parts per million ("ppm")), high specific gravity (greater than 1.5), a high boiling point (greater than 90° C.), and a low refractive index (less than 1.2).

The choice of suspending fluid may be based on concerns of chemical inertness, density matching to the electrophoretic particle, or chemical compatibility with both the electrophoretic particle and bounding capsule. The viscosity of the fluid should be low when movement of the particles is desired. The refractive index of the suspending fluid may also be substantially matched to that of the particles. As used herein, the refractive index of a suspending fluid is "substantially matched" to that of a particle if the difference between their respective refractive indices is between about zero and about 0.3, and is preferably between about 0.05 and about 0.2.

Additionally, the fluid may be chosen to be a poor solvent for some polymers; such a poor solvent is advantageous for use in the fabrication of microparticles, because it increases the range of polymeric materials useful in fabricating particles of polymers and pigments. Organic solvents, such as halogenated organic solvents, saturated linear or branched hydrocarbons, silicone oils, and low molecular weight halogen-containing polymers are some useful suspending fluids. The suspending fluid may comprise a single fluid. The fluid will, however, often be a blend of more than one fluid in order to tune its chemical and physical properties. Furthermore, the fluid may contain surface modifiers to modify the surface energy or charge of the electrophoretic particle or bounding capsule. Reactants or solvents for the microencapsulation process (oil soluble monomers, for example) can also be contained in the suspending fluid. Charge control agents can also be added to the suspending fluid.

Useful organic solvents include, but are not limited to, epoxides, such as decane epoxide and dodecane epoxide; vinyl ethers, such as cyclohexyl vinyl ether and Decave® (International Flavors & Fragrances, Inc., New York, N.Y.); and aromatic hydrocarbons, such as toluene and naphthalene. Useful halogenated organic solvents include, but are not limited to, tetrafluorodibromoethylene, tetrachloroethylene, trifluorochloroethylene, 1,2,4-trichlorobenzene and carbon tetrachloride. These materials have high densities. Useful hydrocarbons include, but are not limited to, dodecane, tetradecane, the aliphatic hydrocarbons in the Isopar® series (Exxon, Houston, Tex.), Norpar® (a series of normal paraffinic liquids), Shell-Sol® (Shell, Houston, Tex.), and Sol-Trol® (Shell), naphtha, and other petroleum solvents. These materials usually have low densities. Useful examples of silicone oils include, but are not limited to, octamethyl cyclosiloxane and higher molecular weight cyclic siloxanes, poly(methyl phenyl siloxane), hexamethyldisiloxane, and polydimethylsiloxane. These materials usually have low densities. Useful low molecular weight halogen-containing polymers include, but are not limited to, poly(chlorotrifluoroethylene) polymer (Halogenated Hydrocarbon Inc., River Edge, N.J.), Galden® (a perfluorinated ether from Ausimont, Morristown, N.J.), or Krytox® from du Pont (Wilmington, Del.). In a preferred embodiment, the suspending fluid is a poly(chlorotrifluoroethylene) polymer. In a particularly preferred embodiment, this polymer has a degree of polymerization from about 2 to about 10. Many of the above materials are available in a range of viscosities, densities, and boiling points.

The fluid must be capable of being formed into small droplets prior to a capsule being formed. Processes for forming small droplets include flow-through jets, membranes, nozzles, or orifices, as well as shear-based emulsifying schemes. The formation of small drops may be assisted by electrical or sonic fields. Surfactants and polymers can be used to aid in the stabilization and emulsification of the droplets in the case of an emulsion type encapsulation. One surfactant for use in displays of the invention is sodium dodecylsulfate.

It can be advantageous in some displays for the suspending fluid to contain an optically absorbing dye. This dye must be soluble in the fluid, but will generally be insoluble in the other components of the capsule. There is much flexibility in the choice of dye material. The dye can be a pure compound, or blends of dyes to achieve a particular color, including black. The dyes can be fluorescent, which would produce a display in which the fluorescence properties depend on the position of the particles. The dyes can be photoactive, changing to another color or becoming colorless upon irradiation with either visible or ultraviolet light, providing another means for obtaining an optical response. Dyes could also be polymerizable by, for example, thermal, photochemical or chemical diffusion processes, forming a solid absorbing polymer inside the bounding shell.

There are many dyes that can be used in encapsulated electrophoretic displays. Properties important here include light fastness, solubility in the suspending liquid, color, and cost. These dyes are generally chosen from the classes of azo, anthraquinone, and triphenylmethane type dyes and may be chemically modified so as to increase their solubility in the oil phase and reduce their adsorption by the particle surface.

A number of dyes already known to those skilled in the art of electrophoretic displays will prove useful. Useful azo dyes include, but are not limited to: the Oil Red dyes, and the Sudan Red and Sudan Black series of dyes. Useful anthraquinone dyes include, but are not limited to: the Oil Blue dyes, and the Macrolex Blue series of dyes. Useful triphenylmethane dyes include, but are not limited to, Michler"s hydrol, Malachite Green, Crystal Violet, and Auramine O.

The ratio of particles to suspending fluid to suspending fluid may vary over a wide range depending upon, inter alia, the density and opacity of the particles, the desired switching speed of the display and the degree of bistability desired. Typically, the particles will comprise from about 0.5 per cent to about 20 per cent by weight of the internal phase. However, in some dual particle systems, it may be advantageous to use substantially higher particle loadings in order to enhance the bistability of the images produced. Dual particle electrophoretic media in which the two types of particles carry charges of opposite polarity flocculate naturally because of the electrostatic attraction between the oppositely charged particles. At high particles loadings, with the particles constituting around 50 to 70 weight per cent of the internal phase, the resultant floc structure essentially fills the volume of the internal phase and holds the particles close to their addressed state (i.e., close to the positions which they occupy after an electric field has been applied to the medium for a period sufficient to drive the display to one of its two extreme optical states), thus enhancing the bistability of the display. The density, strength and rate of flocculation are readily controlled by adjusting particle charge, size and steric barrier thickness and composition. This method of increasing by increasing particle loading has the advantage that no extraneous material is added to the internal phase, and that the floc structure will stabilize not only the two extreme optical states but also the intermediate gray states. Also, this method reduces the temperature sensitivity of the stable states and reduces sticking of the particles to the capsule walls. The Bingham viscosity of the internal phase remains low, and even small floc volumes will aid in maintaining image bistability. Finally, the floc structure is easily broken by a short alternating current pulse, which can readily be applied before the direct current pulse used to alter the optical state of the display.

C. Charge Control Agents and Particle Stabilizers

Charge control agents are used to provide good electrophoretic mobility to the electrophoretic particles. Stabilizers are used to prevent agglomeration of the electrophoretic particles, as well as prevent the electrophoretic particles from irreversibly depositing onto the capsule wall. Either component can be constructed from materials across a wide range of molecular weights (low molecular weight, oligomeric, or polymeric), and may be a single pure compound or a mixture. The charge control agent used to modify and/or stabilize the particle surface charge is applied as generally known in the arts of liquid toners, electrophoretic displays, non-aqueous paint dispersions, and engine-oil additives. In all of these arts, charging species may be added to non-aqueous media in order to increase electrophoretic mobility or increase electrostatic stabilization. The materials can improve steric stabilization as well. Different theories of charging are postulated, including selective ion adsorption, proton transfer, and contact electrification.

An optional charge control agent or charge director may be used. These constituents typically consist of low molecular weight surfactants, polymeric agents, or blends of one or more components and serve to stabilize or otherwise modify the sign and/or magnitude of the charge on the electrophoretic particles. The charging properties of the pigment itself may be accounted for by taking into account the acidic or basic surface properties of the pigment, or the charging sites may take place on the carrier resin surface (if present), or a combination of the two. Additional pigment properties which may be relevant are the particle size distribution, the chemical composition, and the lightfastness.

Charge adjuvants may also be added. These materials increase the effectiveness of the charge control agents or charge directors. The charge adjuvant may be a polyhydroxy compound or an aminoalcohol compound, and is preferably soluble in the suspending fluid in an amount of at least 2% by weight. Examples of polyhydroxy compounds which contain at least two hydroxyl groups include, but are not limited to, ethylene glycol, 2,4,7,9-tetramethyidecyne-4,7-diol, poly(propylene glycol), pentaethylene glycol, tripropylene glycol, triethylene glycol, glycerol, pentaerythritol, glycerol tris(12-hydroxystearate), propylene glycerol monohydroxystearate, and ethylene glycol monohydroxystearate. Examples of aminoalcohol compounds which contain at least one alcohol function and one amine function in the same molecule include, but are not limited to, triisopropanolamine, triethanolamine, ethanolamine, 3o-aminophenol, 5-amino-1-pentanol, and tetrakis(2-hydroxy The charge adjuvant is preferably present in the suspending fluid in an amount of about 1 to about 100 milligrams per gram ("mg/g") of the particle mass, and more preferably about 50 to about 200 mg/g.

The surface of the particle may also be chemically modified to aid dispersion, to improve surface charge, and to improve the stability of the dispersion, for example. Surface modifiers include organic siloxanes, organohalogen silanes and other functional silane coupling agents (Dow Corning® Z-6070, Z-6124, and 3 additive, Midland, Mich.); organic titanates and zirconates (Tyzor® TOT, TBT, and TE Series, du Pont); hydrophobing agents, such as long chain ($C_{12}$ to $C_{50}$) alkyl and alkyl benzene sulphonic acids, fatty amines or diamines and their salts or quaternary derivatives; and amphipathic polymers which can be covalently bonded to the particle surface.

In general, it is believed that charging results as an acid-base reaction between some moiety present in the continuous phase and the particle surface. Thus useful materials are those which are capable of participating in such a reaction, or any other charging reaction as known in the art.

Different non-limiting classes of charge control agents which are useful include organic sulfates or sulfonates, metal soaps, block or comb copolymers, organic amides, organic zwitterions, and organic phosphates and phosphonates. Useful organic sulfates and sulfonates include, but are not limited to, sodium bis(2-ethylhexyl) sulfosuccinate, calcium dodecylbenzenesulfonate, calcium petroleum sulfonate, neutral or basic barium dinonylnaphthalene sulfonate, neutral or basic calcium dinonylnaphthalene sulfonate, dodecylbenzenesulfonic acid sodium salt, and ammonium lauryl sulfate. Useful metal soaps include, but are not limited to, basic or neutral barium petronate, calcium petronate, Co—, Ca—, Cu—, Mn—, Ni—, Zn—, and Fe— salts of naphthenic acid, Ba—, Al—, Zn—, Cu—, Pb—, and Fe— salts of stearic acid, divalent and trivalent metal carboxylates, such as aluminum tristearate, aluminum octanoate, lithium heptanoate, iron stearate, iron distearate, barium stearate, chromium stearate, magnesium octanoate, calcium stearate, iron naphthenate, zinc naphthenate, Mn— and Zn— heptanoate, and Ba—, Al—, Co—, Mn—, and Zn— octanoate. Useful block or comb copolymers include, but are not limited to, AB diblock copolymers of (A) polymers of 2-(N,N-dimethylamino)ethyl methacrylate quaternized with methyl p-toluenesulfonate and (B) poly(2-ethylhexyl methacrylate), and comb graft copolymers with oil soluble tails of poly(12-hydroxystearic acid) and having a molecular weight of about 1800, pendant on an oil-soluble anchor group of poly(methyl methacrylate-methacrylic acid). Useful organic amides include, but are not limited to, polyisobutylene succinimides such as OLOA 371 and 1200, N-vinylpyrrolidone polymers and other polyamine condensates, such as Solsperse 13940 and 17000. Useful organic zwitterions include, but are not limited to, lecithin. Useful organic phosphates and phosphonates include, but are not limited to, the sodium salts of phosphated mono- and di-glycerides with saturated and unsaturated acid substituents.

Particle dispersion stabilizers may be added to prevent particle flocculation or attachment to the capsule walls. For the typical high resistivity liquids used as suspending fluids in electrophoretic displays, non-aqueous surfactants may be used. These include, but are not limited to, glycol ethers, acetylenic glycols, alkanolamides, sorbitol derivatives, alkyl amines, quaternary amines, imidazolines, dialkyl oxides, and sulfosuccinates.

D. Encapsulation

Encapsulation of the internal phase may be accomplished in a number of different ways. Numerous suitable procedures for microencapsulation are detailed in both Microencapsulation, Processes and Applications, (I. E. Vandegaer, ed.), Plenum Press, New York, N.Y. (1974) and Gutcho, Microcapsules and Microencapsulation Techniques, Noyes Data Corp., Park Ridge, N.J. (1976). The processes fall into several general categories, all of which can be applied to the present invention: interfacial polymerization, in situ polymerization, physical processes, such as coextrusion and other phase separation processes, in-liquid curing, and simple/complex coacervation.

Numerous materials and processes should prove useful in formulating displays of the present invention. Useful materials for simple coacervation processes to form the capsule include, but are not limited to, gelatin, poly(vinyl alcohol), poly(vinyl acetate), and cellulosic derivatives, such as, for example, carboxymethylcellulose. Useful materials for complex coacervation processes include, but are not limited to, gelatin, acacia, carageenan, carboxymethylcellulose, hydrolyzed styrene anhydride copolymers, agar, alginate, casein, albumin, methyl vinyl ether co-maleic anhydride, and cellulose phthalate. Useful materials for phase separation processes include, but are not limited to, polystyrene, poly (methyl methacrylate) (PMMA), poly(ethyl methacrylate), poly(butyl methacrylate), ethyl cellulose, poly (vinylpyridine), and polyacrylonitrile. Useful materials for in situ polymerization processes include, but are not limited to, polyhydroxyamides, with aldehydes, melamine, or urea and formaldehyde; water-soluble oligomers of the condensate of melamine, or urea and formaldehyde; and vinyl monomers, such as, for example, styrene, methyl methacrylate (MMA) and acrylonitrile. Finally, useful materials for interfacial polymerization processes include, but are not limited to, diacyl chlorides, such as, for example, sebacoyl, adipoyl, and di- or poly-amines or alcohols, and isocyanates. Useful emulsion polymerization materials may include, but are not limited to, styrene, vinyl acetate, acrylic acid, butyl acrylate, t-butyl acrylate, methyl methacrylate, and butyl methacrylate.

Capsules produced may be dispersed into a curable carrier, resulting in an ink which may be printed or coated on large and arbitrarily shaped or curved surfaces using conventional printing and coating techniques.

In the context of the present invention, one skilled in the art will select an encapsulation procedure and wall material based on the desired capsule properties. These properties include the distribution of capsule radii; electrical, mechanical, diffusion, and optical properties of the capsule wall; and chemical compatibility with the internal phase of the capsule.

The capsule wall generally has a high electrical resistivity. Although it is possible to use walls with relatively low resistivities, this may limit performance in requiring relatively higher addressing voltages. The capsule wall should also be mechanically strong (although if the finished capsule powder is to be dispersed in a curable polymeric binder for coating, mechanical strength is not as critical). The capsule wall should generally not be porous. If, however, it is desired to use an encapsulation procedure that produces porous capsules, these can be overcoated in a post-processing step (i.e., a second encapsulation). Moreover, if the capsules are to be dispersed in a curable binder, the binder will serve to close the pores. The capsule walls should be optically clear. The wall material may, however, be chosen to match the refractive index of the internal phase of the capsule (i.e., the suspending fluid) or a binder in which the capsules are to be dispersed. For some applications (e.g., interposition between two fixed electrodes), monodispersed capsule radii are desirable.

An encapsulation technique that is suited to the present invention involves a polymerization between urea and formaldehyde in an aqueous phase of an oil/water emulsion in the presence of a negatively charged, carboxyl-substituted, linear hydrocarbon polyelectrolyte material. The resulting capsule wall is a urea/formaldehyde copolymer, which discretely encloses the internal phase. The capsule is clear, mechanically strong, and has good resistivity properties.

The related technique of in situ polymerization utilizes an oil/water emulsion, which is formed by dispersing the electrophoretic fluid (i.e., the dielectric liquid containing a suspension of the pigment particles) in an aqueous environment. The monomers polymerize to form a polymer with higher affinity for the internal phase than for the aqueous phase, thus condensing around the emulsified oily droplets. In one in situ polymerization process, urea and formaldehyde condense in the presence of poly(acrylic acid) (see, e.g., U.S. Pat. No. 4,001,140). In other processes, described in U.S. Pat. No. 4,273,672, any of a variety of cross-linking agents borne in aqueous solution is deposited around microscopic oil droplets. Such cross-linking agents include aldehydes, especially formaldehyde, glyoxal, or glutaraldehyde; alum; zirconium salts; and polyisocyanates.

The coacervation approach also utilizes an oil/water emulsion. One or more colloids are coacervated (i.e., agglomerated) out of the aqueous phase and deposited as shells around the oily droplets through control of temperature, pH and/or relative concentrations, thereby creating the microcapsule. Materials suitable for coacervation include gelatins and gum arabic. See, e.g., U.S. Pat. No. 2,800,457.

The interfacial polymerization approach relies on the presence of an oil-soluble monomer in the electrophoretic composition, which once again is present as an emulsion in an aqueous phase. The monomers in the minute hydrophobic droplets react with a monomer introduced into the aqueous phase, polymerizing at the interface between the droplets and the surrounding aqueous medium and forming shells around the droplets. Although the resulting walls are relatively thin and may be permeable, this process does not require the elevated temperatures characteristic of some other processes, and therefore affords greater flexibility in terms of choosing the dielectric liquid.

Coating aids can be used to improve the uniformity and quality of the coated or printed electrophoretic ink material. Wetting agents are typically added to adjust the interfacial tension at the coating/substrate interface and to adjust the liquid/air surface tension. Wetting agents include, but are not limited to, anionic and cationic surfactants, and nonionic species, such as silicone or fluoropolymer-based materials. Dispersing agents may be used to modify the interfacial tension between the capsules and binder, providing control over flocculation and particle settling.

Surface tension modifiers can be added to adjust the air/ink interfacial tension. Polysiloxanes are typically used in such an application to improve surface leveling while minimizing other defects within the coating. Surface tension modifiers include, but are not limited to, fluorinated surfactants, such as, for example, the Zonyl® series from du Pont, the Fluorad® series from 3M (St. Paul, Minn.), and the fluoroalkyl series from Autochem (Glen Rock, N.J.); siloxanes, such as, for example, Silwet® from Union Carbide (Danbury, Conn.); and polyethoxy and polypropoxy alcohols. Antifoams, such as silicone and silicone-free polymeric materials, may be added to enhance the movement of air from within the ink to the surface and to facilitate the rupture of bubbles at the coating surface. Other useful antifoams include, but are not limited to, glyceryl esters, polyhydric alcohols, compounded antifoams, such as oil solutions of alkylbenzenes, natural fats, fatty acids, and metallic soaps, and silicone antifoaming agents made from the combination of dimethyl siloxane polymers and silica. Stabilizers such as UV-absorbers and antioxidants may also be added to improve the lifetime of the ink.

E. Binder Material

The binder typically is used as an adhesive medium that supports and protects the capsules, as well as binds the electrode materials to the capsule dispersion. A binder can be non-conducting, semiconductive, or conductive. Binders are available in many forms and chemical types. Among these are water-soluble polymers, water-borne polymers, oil-soluble polymers, thermoset and thermoplastic polymers, and radiation-cured polymers.

Among the water-soluble polymers are the various polysaccharides, the polyvinyl alcohols, N-methylpyrrolidone, N-vinylpyrrolidone, the various Carbowax® species (Union Carbide, Danbury, Conn.), and poly(2-hydroxyethyl acrylate).

The water-dispersed or water-borne systems are generally latex compositions, typified by the Neorez® and Neocryl® resins (Zeneca Resins, Wilmington, Mass.), Acrysol® (Rohm and Haas, Philadelphia, Pa.), Bayhydrol® (Bayer, Pittsburgh, Pa.), and the Cytec Industries (West Paterson, N.J.) HP line. These are generally latices of polyurethanes, occasionally compounded with one or more of the acrylics, polyesters, polycarbonates or silicones, each lending the final cured resin in a specific set of properties defined by glass transition temperature, degree of tack, softness, clarity, flexibility, water permeability and solvent resistance, elongation modulus and tensile strength, thermoplastic flow, and solids level. Some water-borne systems can be mixed with reactive monomers and catalyzed to form more complex resins. Some can be further cross-linked by the use of a cross-linking reagent, such as an aziridine, for example, which reacts with carboxyl groups.

A typical application of a water-borne resin and aqueous capsules follows. A volume of particles is centrifuged at low speed to separate excess water. After a given centrifugation process, for example 10 minutes at 60×gravity (g), the capsules are found at the bottom of the centrifuge tube, while the water is at the top. The water is carefully removed (by decanting or pipetting). The mass of the remaining capsules is measured, and a mass of resin is added such that the mass of resin is, for example, between one eighth and one tenth of the weight of the capsules. This mixture is gently mixed on an oscillating mixer for approximately one half hour. After about one half hour, the mixture is ready to be coated onto the appropriate substrate.

The thermoset systems are exemplified by the family of epoxies. These binary systems can vary greatly in viscosity, and the reactivity of the pair determines the pot life of the mixture. If the pot life is long enough to allow a coating operation, capsules may be coated in an ordered arrangement in a coating process prior to the resin curing and hardening.

Thermoplastic polymers, which are often polyesters, are molten at high temperatures. A typical application of this type of product is hot-melt glue. A dispersion of heat-resistant capsules could be coated in such a medium. The solidification process begins during cooling, and the final hardness, clarity and flexibility are affected by the branching and molecular weight of the polymer.

Oil or solvent-soluble polymers are often similar in composition to the water-borne system, with the obvious exception of the water itself. The latitude in formulation for solvent systems is enormous, limited only by solvent choices and polymer solubility. Of considerable concern in solvent-based systems is the viability the capsule itself; the integrity of the capsule wall cannot be compromised in any way by the solvent.

Radiation cure resins are generally found among the solvent-based systems. Capsules may be dispersed in such a medium and coated, and the resin may then be cured by a timed exposure to a threshold level of ultraviolet radiation, either long or short wavelength. As in all cases of curing polymer resins, final properties are determined by the branching and molecular weights of the monomers, oligomers and cross-linkers.

A number of water-reducible monomers and oligomers are, however, marketed. In the strictest sense, they are not water soluble, but water is an acceptable diluent at low concentrations and can be dispersed relatively easily in the mixture. Under these circumstances, water is used to reduce the viscosity (initially from thousands to hundreds of thousands centipoise). Water-based capsules, such as those made from a protein or polysaccharide material, for example, could be dispersed in such a medium and coated, provided the viscosity could be sufficiently lowered. Curing in such systems is generally by ultraviolet radiation.

Like other encapsulated electrophoretic displays, the encapsulated electrophoretic displays of the present invention provide flexible, reflective displays that can be manufactured easily and consume little power (or no power in the case of bistable displays in certain states). Such displays, therefore, can be incorporated into a variety of applications and can take on many forms. Once the electric field is removed, the electrophoretic particles can be generally stable. Additionally, providing a subsequent electric charge can alter a prior configuration of particles. Such displays may include, for example, a plurality of anisotropic particles and a plurality of second particles in a suspending fluid. Application of a first electric field may cause the anisotropic particles to assume a specific orientation and present an optical property. Application of a second electric field may then cause the plurality of second particles to translate, thereby disorienting the anisotropic particles and disturbing the optical property. Alternatively, the orientation of the anisotropic particles may allow easier translation of the plurality of second particles. Alternatively or in addition, the particles may have a refractive index that substantially matches the refractive index of the suspending fluid.

An encapsulated electrophoretic display may take many forms. The capsules of such a display may be of any size or shape. The capsules may, for example, be spherical and may have diameters in the millimeter range or the micron range, but are preferably from about ten to about a few hundred microns. The particles within the capsules of such a display may be colored, luminescent, light-absorbing or transparent, for example.

The following Examples are now given, though by way of illustration only, to show details of particularly preferred reagents, conditions and techniques used in the electrophoretic media and displays of the present invention. All centrifuging mentioned was carried out on a Beckman GS-6 or Allegra 6 centrifuge (available from Beckman Coulter, Inc., Fullerton, Calif. 92834).

EXAMPLE 1

This Example illustrates the provision of a silica coating on a magnetic particle which may be used in the present media and displays. The procedure used is adapted from U.S. Pat. No. 3,639,133.

Magnetite ($Fe_3O_4$, 50 g, ground to an average particle size of about 0.1 to 0.6 μm; the material used was Bayferrox 303T, available from Bayer AG, Leverkusen, Germany "BAYFERROX" is a Registered Trade Mark) was placed in a sodium silicate solution (415 ml of a 0.073M solution with 1.9% sodium hydroxide), and the resultant mixture was rapidly stirred in air and then sonicated at 30–35° C. The suspension was then heated to 90–95° C. over a period of 1 hour and sulfuric acid (150 ml of a 0.22 M solution) and additional sodium silicate (75 ml of a 0.83 M solution with 0.2% sodium hydroxide) were added simultaneously over a period of 2.5 to 3 hours, with stirring. After these additions had been completed, the reaction mixture was stirred for an additional 15 minutes, then cooled slowly to room temperature, added to plastic bottles and centrifuged at 3500 rpm for 15 minutes. The supernatant liquor was decanted, and the silica-coated pigment re-dispersed in deionized water and centrifuged at 3500 rpm for 15 minutes. The washing was repeated twice more, and the pigment finally dried in air for 24 hours, and then in an oven at 85° C. for 2 hours.

EXAMPLE 2

This Example illustrates reaction of the silica-coated pigment prepared in Example 1 with a bifunctional reagent in the first stage of a process to provide a polymer-coated magnetite useful in the electrophoretic media and displays of the present invention.

To a mixture of ethanol (1000 ml) and water (100 mL), concentrated ammonium hydroxide was added until the pH reached 9.0–9.5, N-[3-(trimethoxysilyl)-(4-vinylbenzyl) ethylene diamine hydrochloride (40 g of a 40 weight per cent solution in methanol) was added, and the resultant solution was stirred rapidly for 4 minutes. The silica-coated magnetite (50 g) prepared in Example 1 was then added, and the mixture stirred rapidly for 7 minutes. The resultant suspension was poured into plastic bottles and centrifuged at 3500 rpm for 30 minutes. The supernatant liquor was decanted, and the silanized pigment re-dispersed in ethanol and centrifuged at 3500 rpm on the same centrifuge for 30 minutes, and the liquid decanted. The washing was repeated, and the pigment finally dried in air for 18 hours, then under vacuum at 70° C. for 2 hours.

EXAMPLE 3

This Example illustrates conversion of the silanized pigment produced in Example 2 to the corresponding polymer-coated magnetite.

The silanized pigment produced in Example 2 (50 g) was placed in a round-bottomed flask with toluene (50 g) and lauryl methacrylate (50 g). The resultant mixture was stirred rapidly under a nitrogen atmosphere (argon may alternatively be used) for 20 minutes, then slowly heated to 50° C. and AIBN (0.5 g in 10 ml of toluene) added quickly. The suspension was then heated to 65° C. and stirred at this temperature under nitrogen for a further 18 hours. The resultant viscous suspension was poured into plastic bottles, the flask being washed out with ethyl acetate to remove residual product and the ethyl acetate solution added to the bottles. The bottles were centrifuged at 3500 rpm for 30 minutes. The supernatant liquor was decanted, and the polymer-coated pigment re-dispersed in ethyl acetate and centrifuged at 3500 rpm for 30 minutes, and the liquid decanted. The washing was repeated, and the pigment dried in air until a workable powder was obtained, and then under vacuum at 65° C. for 6 to 18 hours.

EXAMPLE 4

This Example illustrates the preparation of a polymer-coated titania useful in the electrophoretic media and displays of the present invention.

Part A

Preparation of Silanized Titania

To a 4 L glass reactor equipped with a stirrer and a pH meter were added ethanol (930.7 g) and deionized water (69.3 g), and the resultant solution was stirred at 150 rpm. The probe of the pH meter was inserted into the reactor and the pH of the mixture was lowered to 4.5 by adding glacial acetic acid from a pipette. The pH probe was then removed, 3-(trimethoxysilyl)propyl methacrylate (160.0 g) was added to the reactor, and the reaction mixture was stirred for a further 5 minutes. The mixing speed was then increased to 250 rpm, titania (1000 g of du Pont R960) was added to the reactor, and the reaction mixture was stirred for a further 10 minutes. The mixing speed was then decreased to 200 rpm, ethanol (1826.6 g) was added to the reactor, and stirring was continued for 1 minute. The reaction mixture was then drained into six 750 ml centrifuge bottles and centrifuged at 3000 rpm for 20 minutes. The supernatant liquor was discarded and the solids dried in air overnight and then under vacuum for 4 hours at 65° C.

Part B

Preparation of Polymer-Coated Pigment

To a 4 L glass reactor equipped with a water bath, a nitrogen source, a condenser, a stirrer and a septum were added lauryl methacrylate (960 g) and toluene (1386 g). The mixture was stirred at 200 rpm and the water bath was set to 50° C. to preheat the reactor. The silanized titania (750 g, prepared in Part A above) was weighed out and any large chunks crushed manually. The mixer speed was then increased to 300 rpm and the silanized titania was added to the reactor, which was then purged with nitrogen. Separately AIBN (5.64 g) was dissolved in toluene (150 g) and the resultant solution loaded into a syringe pump, the output needle of which was pushed through the septum into the reactor. Once the reactor temperature had stabilized at 50° C., the AIBN solution was pumped into the reaction mixture at a uniform rate over a period of 1 hour. The reaction mixture was then held at 50° C. with stirring overnight, then drained into six 750 ml centrifuge bottles, which were filled with toluene and shaken until a substantially uniform dispersion was obtained. The bottles were then centrifuged at 3000 rpm for 30 minutes, the supernatant liquor was discarded, and the toluene dispersion, centrifugation and decantation steps repeated. Finally, the bottles were allowed to dry in air overnight, and then in vacuum at 65° C. for 4 hours.

EXAMPLE 5

This Example illustrates the construction of an encapsulated dual particle display using the polymer-coated pigments prepared in Examples 3 and 4.

The suspending fluid used is a mixture of a 1:1 w/w mixture of a hydrocarbon (Isopar-G, available commercially from Exxon Corporation, Houston, Tex.; "Isopar" is a Registered Trade Mark) and a halogenated hydrocarbon oil (Halogenated hydrocarbon oil 1.8, available commercially from Halogenated Hydrocarbon Products Corporation, River Edge, N.J. referred to hereinafter for simplicity as "Halocarbon"); this mixture is hereinafter referred to as "1:1 Isopar/Halocarbon mixture". The suspending fluid contains Solsperse 17000 (available commercially from Avecia Ltd., Blackley, Manchester, United Kingdom; "Solsperse" is a Registered Trade Mark) as a charge control agent, and Span 85 (sold by ICI Americas, Inc., Wilmington, Del.; "Span" is a Registered Trade Mark) as a dispersant.

Part A

Preparation of Internal Phase

To make approximately 100 ml of internal phase ready for encapsulation, there were used 3.219 g of polymer-coated magnetite prepared in Example 3 above and 4.438 g of polymer-coated titania prepared in Example 4 above. These pigments were mixed with Solsperse 17000 dispersant (0.444 g. added in the form of a 10 w/w % solution in Isopar G), Span 85 dispersant (0.444 g) and the 1:1 w/w mixture (99.112 g). The resultant solution was well shaken and stored on a roll mill for at least 24 hours before being used in the encapsulation process.

Part B: Encapsulation

The internal phase thus prepared was then encapsulated using a reactor equipped with a water jacket, an overhead stirrer, a dropping funnel and a pH meter. Gelatin (4.5was dissolved in deionized water (262.2 g) at 40° C. with stirring, care being taken to ensure that no foam was produced on the surface of the solution. Separately, acacia (3.33 g) was dissolved in deionized water (65.56 g) and the resultant solution heated to 40° C. Also separately, the internal phase described above was heated to 40° C. and then added to the gelatin solution; the gelatin solution was stirred during the addition, which was conducted by introducing the internal phase through the dropping funnel, the outlet of which was placed below the surface of the gelatin solution. After the addition of the internal phase was complete, the rate of stirring was increased and the stirring continued for 30 minutes at 40° C. in order to emulsify the internal phase into droplets having an average diameter of about 200 $\mu$m.

The acacia solution was then added over a period of about 1 minute, care being taken to avoid foaming. The pH of the mixture was lowered to 4.82 using 10 per cent aqueous acetic acid, and the vigorous stirring was continued to a further 40 minutes at the same temperature. The temperature of the mixture was lowered to 10° C. over a period of two hours, with continued vigorous stirring, and glutaraldehyde (1.7 g) was added. After this addition, the mixture was gradually warmed to 25° C. and stirred vigorously overnight. Finally, stirring was discontinued, and the mixture was allowed to settle for 10–15 minutes, during which time a foamy mixture separated on top of the liquid.

The liquid phase was then removed, leaving the foamy mixture in the reactor, and the capsules in this liquid phase washed three times by sedimentation and redispersion in deionized water. The capsules were separated by size to yield a distribution between 100 and 300 $\mu$m diameter, with a mean diameter of about 200 $\mu$m; such a distribution can be effected by hand sieving the capsules to produce the final capsule slurry.

Part C: Production of Electrophoretic Display

The resulting capsule slurry was centrifuged and then mixed with an aqueous urethane binder (NeoRez R-9320) at a ratio of 1 part by weight binder to 9 parts by weight of capsules, and 0.3 weight per cent of hydroxypropylmethylcellulose was added as a slot-coating additive. The resultant mixture was slot coated on to a 125 $\mu$m thick indium-tin oxide coated polyester film moving at 1 m/sec relative to the slot coating head. The coated film was allowed to air dry for 10 minutes, then oven dried at 50° C. for 15 minutes to produce an electrophoretic medium approximately 50 $\mu$m thick containing essentially a single layer of capsules (see the aforementioned published International Patent Application WO 00/20922).

To provide an experimental electrophoretic display, comprising only a single which could be used to investigate the properties of the electrophoretic medium thus prepared, the capsule-coated surface of the coated film was then overcoated with the aforementioned NeoRez R-9320 binder using a doctor blade with a 13 mil (330 $\mu$m) gap setting (this binder serves both to planarize the capsule-coated surface and as a lamination adhesive) and the overcoated film dried at 50° C. for 20 minutes. The dried film was then hot laminated to a second polyester film coated, on the side facing the electrophoretic medium, with indium tin oxide to produce the final electrophoretic display.

The resulting dual particle display could be switched between its black and white states in not more than 500 msec by applying a voltage of 42 V across the indium tin oxide electrode, or more slowly by applying only 10 V across the electrodes. However, when a bonded ferrite magnetic sheet, of the type used in so-called refrigerator magnets, was placed in contact with one of the polyester sheets, the display could not be switched at 10 V, thus showing that the magnetite particles were being retained adjacent the electrode closer to the magnet, despite the electric field produced by the applied voltage. However, even with the magnet present, the display switched at 42 V. Thus, the inclusion of the magnetic particles provided a threshold for switching of this display.

EXAMPLE 6

This Example illustrates the construction of an encapsulated display generally similar to that constructed in Example 5 above, but also containing chromium oxide particles.

Chromium oxide ($Cr_2O_3$, 50 g, ground to an average particle size of about 0.1 to 0.6 $\mu$m; the material used was Bayer Green GX, available from Bayer AG, Leverkusen, Germany) was silica coated and then polymer-coated in the same manner as described in Examples 1 to 3 above. Thermogravimetric analysis of the polymer-coated product showed a weight loss of about 3.55 per cent.

An encapsulated three particle display was then constructed using this polymer-coated chromium-oxide and the polymer-coated pigments prepared in Examples 3 and 4.

To make approximately 100 ml of internal phase ready for encapsulation, there were used 4.154 g of polymer-coated magnetite prepared in Example 3 above, 5.548 g of polymer-coated titania prepared in Example 4 above and 4.147 g of the polymer-coated chromium oxide. These pigments were mixed with Solsperse 17000 dispersant (0.555 g. added in the form of a 10 w/w % solution in Isopar G), Span 85 dispersant (0.555 g) and the 1:1 w/w Isopar/Halocarbon mixture (98.89 g). The resultant solution was well shaken and stored on a roll mill for at least 24 hours before being used in the encapsulation process.

Encapsulation and production of the electrophoretic display were conducted in the same manner as in Example 5 above.

One polyester sheet of the resulting three-particle display was placed in contact with a bonded ferrite magnetic sheet, of the type used in so-called "refrigerator magnets", and viewed through the other polyester sheet. Upon application of 10 V pulses across the electrodes, the display switched between white and green colored states in not more than 500 msec, thus showing that the magnetite particles were being retained adjacent the electrode closer to the magnet, despite the electric field produced by the applied voltage. When the drive voltage was increased to 42 V, the display switched between white and black states in not more than 500 msec, even with the magnet present, the black state being the result of both black and green particles being present adjacent the sheet through which the display was viewed. Thus, the inclusion of the magnetic particles enabled three optical states to be produced in the single pixel of this display.

EXAMPLE 7

This Example illustrates the construction of an encapsulated display generally similar to that constructed in Example 6 above but containing iron oxide particles in place of the chromium oxide particles.

Iron oxide ($Fe_2O_3$, 50 g, ground to an average particle size of about 0.1 to 1.2 $\mu$m; the material used was APC 944 Synthetic Red Iron Oxide, available from Alabama Pigments Company, Greenpond, Ala. 35074, United States of America) was silica coated and then polymer coated in the same manner as described in Examples 1 to 3 above. Thermogravimetric analysis of the polymer-coated product showed a weight loss of about 8.30 per cent.

An encapsulated three-particle display was then constructed using this polymer-coated iron oxide and the polymer-coated pigments prepared in Examples 3 and 4 above.

To make approximately 100 ml of internal phase ready for encapsulation, there were used 4.154 g of polymer-coated magnetite prepared in Example 3 above, 5.548 g of polymer-coated titania prepared in Example 4 above and 4.362 g of the polymer-coated red iron oxide. These pigments were mixed with Solsperse 17000 dispersant (0.555 g. added in the form of a 10 w/w % solution in Isopar G), Span 85 dispersant (0.555 g) and the 1:1 w/w Isopar/Halocarbon mixture (98.89 g). The resultant solution was well shaken and stored on a roll mill for at least 24 hours before being used in the encapsulation process.

Encapsulation and production of the electrophoretic display were conducted in the same manner as in Example 5 above.

The optical performance of the resultant display were tested in the same way as in Example 6 above, with similar results. At 10 V, the display switched between white and red colored states, but at 42 V, the display switched between white and black colored states. Thus, the inclusion of the magnetic particles enabled three optical states to be produced in the single pixel of the display.

EXAMPLE 8

This Example illustrates the construction of an encapsulated display generally similar to that constructed in Example 6 above but using blue cobalt aluminate particles in place of the chromium oxide.

Cobalt aluminate ($CoAl_2O_4$, 50 g, ground to an average particle size of about 0.1 $\mu$m; the material used was Bayer Light Blue 2R, available from Bayer AG, Leverkusen, Germany) was silica coated and then polymer coated in the same manner as described in Examples 1 to 3 above. Thermogravimetric analysis of the polymer-cated product showed a weight loss of about 7.95 per cent.

An encapsulated three-particle display was then constructed in the same manner as in Example 6 above but using the blue cobalt aluminate particles in place of the chromium oxide.

To make approximately 100 ml of internal phase ready for encapsulation, there were used 3.219 g of polymer-coated magnetite prepared in Example 3 above, 5.365 g of polymer-coated titania prepared in Example 4 above and 5.432 g of the polymer-coated blue cobalt aluminate. These pigments were mixed with Solsperse 17000 dispersant (0.537 g. added in the form of a 10 w/w % solution in Isopar G), Span 85 dispersant (0.537 g) and the 1:1 w/w Isopar/Halocarbon mixture (98.93 g). The resultant solution was well shaken and stored on a roll mill for at least 24 hours before being used in the encapsulation process.

Encapsulation and production of the electrophoretic display were conducted in the same manner as in Example 5 above.

The optical performance of the resultant display were tested in the same way as in Example 6 above, with similar results. At 10 V, the display switched between white and blue colored states, but at 42 V, the display switched between white and black colored states. Thus, the inclusion of the magnetic particles enabled three optical states to be produced in the single pixel of the display.

EXAMPLE 9

An encapsulated three-particle display was then constructed in the same manner as in Example 6 above but using yellow lead chromate particles in place of the chromium oxide.

Lead chromate ($PbCrO_4$, 50 g, ground to an average particle size of about 0.1 $\mu$m to 1.0 $\mu$m; the material used was Royal Yellow 6000, available from First Color Co., Ltd., Shihung City, Kyounggi-do, Korea) was silica coated and then polymer coated in the same manner as described in Examples 1 to 3 above. Thermogravimetric analysis of the polymer-coated product showed a weight loss of about 9.50 per cent.

An encapsulated three-particle display was then constructed using this polymer-coated lead chromate and the pigments prepared in Examples 3 and 4 above.

To make approximately 100 ml of internal phase ready for encapsulation, there were used 4.159 g of polymer-coated magnetite prepared in Example 3 above, 5.548 g of polymer-coated titania prepared in Example 4 above and 4.424 g of the polymer-coated yellow lead chromate. These pigments were mixed with Solsperse 17000 dispersant (0.555 g. added in the form of a 10 w/w % solution in Isopar G), Span 85 dispersant (0.555 g) and the 1:1 w/w Isopar/Halocarbon mixture (98.89 g). The resultant solution was well shaken and stored on a roll mill for at least 24 hours before being used in the encapsulation process.

Encapsulation and production of the electrophoretic display were conducted in the same manner as in Example 5 above.

The optical performance of the resultant display was tested in the same way as in Example 6 above, with similar results. At 10 V, the display switched between white and yellow colored states, but at 42 V, the display switched between white and black colored states. Thus, the inclusion of the magnetic particles enabled three optical states to be produced in the single pixel of the display.

Numerous changes and modifications can be made in the preferred embodiments of the present invention already described without departing from the spirit and skill of the invention. For example, although the embodiments of the invention illustrated in the accompanying drawings all use permanent magnets, the present invention could make use of electromagnets; using electromagnets allows for switching the magnetic field off and on as required, and also varying the strength of the magnetic field to alter the operating conditions of the display. Similarly, although the embodiments of the invention illustrated in the accompanying drawings all use magnetic particles which are also electrostatically charged and hence electrophoretically mobile, the displays of the present invention may use magnetic particles which are not electrophoretically mobile. Displays using such magnetic but non-electrophoretically mobile particles could be addressed using a combined electrostatic and magnetic writing head. Numerous other possible modifications of the illustrated embodiments will be apparent to those skilled in electrophoretic display technology. Accordingly, the foregoing description is to be construed in an illustrative and not in a limitative sense.

We claim:

1. An electrophoretic medium comprising a plurality of one or more types of particles suspended in suspending fluid, said particles including at least one first magnetic, electrically charged, electrophoretically mobile particle capable of translating through the suspending fluid upon application of an electric field to the medium, the magnetic, electrophoretically mobile particle having a first charge polarity and a first optical characteristic, a second type of particle which is non-magnetic, has a charge polarity opposite of the first charge polarity and has second optical characteristic different from the first optical characteristic, and a third type of particle which is non-magnetic, has a third electrophoretic mobility different from the first and second electrophoretic mobilities and a third optical characteristic different from the first and second optical characteristics.

2. An electrophoretic medium according to claim 1 wherein the suspending fluid is uncolored.

3. An electrophoretic medium according to claim 1 wherein the suspending fluid is colored.

4. An electrophoretic medium according to claim 1 wherein the second and third types of particles bear charges of opposite polarity.

5. An electrophoretic medium according to claim 1 wherein the second and third types of particles bear charges of the same polarity but differ in electrophoretic mobility, and the magnetic particles bear charges of opposite polarity to those on the second and third types of particles.

6. An electrophoretic medium according to claim 1 wherein said magnetic particle comprises one or more of iron tetroxide ($Fe_3O_4$), iron tetroxide/polymer composites, rare earth magnets and Alnico alloys.

7. An electrophoretic medium according to claim 6 wherein said magnetic particles are in the size range of about 0.25 $\mu$m to about 5 $\mu$m.

8. An electrophoretic medium according to claim 7 wherein said magnetic particles have a polymer coating.

9. An electrophoretic medium according to claim 1 wherein said suspending fluid is selected from organic solvents, halogenated solvents, halogenated polymers, silicone oils, linear hydrocarbons, branched hydrocarbons, and mixtures thereof.

10. An electrophoretic medium according to claim 9 wherein said suspending fluid comprises poly (chlorotrifluoroethylene).

11. An electrophoretic medium according to claim 1 comprising a plurality of capsules each having a capsule wall, said particles and said suspending fluid being contained within said capsules.

12. An electrophoretic medium according to claim 11 wherein said capsules are non-spherical.

13. An electrophoretic medium according to claim 1 wherein said particles comprises one or more of neat pigments, dyed pigments, laked pigments, and pigment/polymer composites.

14. An electrophoretic medium according to claim 13 wherein said pigments comprise at least one of iron trioxide ($Fe_2O_3$), lead sulphate ($PbSO_4$), chrome trioxide ($Cr_2O_3$) and cobalt aluminate ($CoAl_2O_4$).

15. An electrophoretic display comprising an electrophoretic medium according to claim 1 further comprising at least one electrode disposed adjacent said electrophoretic medium.

16. An electrophoretic display according to claim 15 further comprising at least one magnet disposed adjacent the electrophoretic medium.

17. An electrophoretic display according to claim 16 wherein said magnet comprises one or more of bonded ferrites, ceramic hard ferrites, aluminum-nickel-cobalt alloys, and rare earth magnets.

18. An electrophoretic display according to claim 17 wherein said magnets are poled.

19. An electrophoretic display according to claim 18 wherein said magnets are poled with poling widths less than about 500 $\mu$m.

20. An electrophoretic display according to claim 19 wherein said electrophoretic medium comprises a plurality of capsules each having a capsule wall, said particles and said suspending fluid being contained within said capsules, and said poling widths are half the width of the said capsules contained within said electrophoretic medium.

21. An electrophoretic display according to claim 16 wherein said magnet is an electromagnet.

22. An electrophoretic display comprising an electrophoretic medium according to claim 15 further comprising a second electrode disposed adjacent the electrophoretic medium and opposite the first electrode, at least one of the electrodes being substantially transparent.

23. An electrophoretic medium comprising a plurality of one or more types of particles suspended in suspending fluid, said particles including at least one electrically charged, electrophoretically mobile particle capable of translating through the suspending fluid upon application of an electric field to the medium, and at least one magnetic particle comprising a core of magnetic material and a shell of non-magnetic material substantially completely surrounding the core.

24. An electrophoretic medium according to claim 23 wherein said core of magnetic material comprises one or more of iron tetroxide ($Fe_3O_4$), iron tetroxide/polymer composites, rare earth magnets and Alnico alloys.

25. An electrophoretic medium according to claim 23 wherein said magnetic particles have a polymer coating surrounding the shell of non-magnetic material.

26. A method of addressing electrophoretic medium, the method comprising:
  (a) providing an electrophoretic medium having opposed first and second surfaces, the medium comprising a suspending fluid having a first optical characteristic, and a plurality of electrically charged magnetic particles suspended in the suspending fluid, the particles having a second optical characteristic different from the first optical characteristic, the medium having a magnet disposed adjacent its first surface;
  (b) allowing the particles to remain adjacent the first face of the display under the magnetic forces applied to the particles by the magnet, thereby causing the first optical characteristic of the fluid to be visible at the second surface of the medium; and
  (c) applying to the medium an electric field having a polarity and magnitude sufficient to cause the particles to move through the suspending fluid against the magnetic forces applied to the particles by the magnet, thereby causing the particles to move adjacent the second surface of the medium and the second optical characteristic of the particles to be visible at the second surface.

27. A method of addressing electrophoretic medium, the method comprising:
  (a) providing an electrophoretic medium having opposed first and second surfaces, the medium comprising a suspending fluid, a plurality of a first type of electrically charged magnetic particles having a first optical characteristic suspended in the suspending fluid, and a plurality of a second type of electrically charged non-magnetic particle having a second optical characteristic different from the first optical characteristic, the second type of particles bearing charges of opposite polarity to the charges on the first type of particles,
the medium having a magnet disposed adjacent its first surface;
  (b) applying to the medium an electric field having a polarity which causes the second type of particles to move adjacent the second surface a the medium, while causing the first type of particles to remain adjacent the first surface of the medium, thereby causing the second optical characteristic to be visible at the second surface; and
  (c) applying to the medium an electric field having a polarity and magnitude sufficient to cause the first particles to move through the suspending fluid against the magnetic forces applied to the first particles by the magnet, thereby causing the first particles to move adjacent the second surface of the medium and the first optical characteristic to be visible at the second surface, while the second particles move adjacent the first surface of the medium.

28. A method according to claim 27 wherein the suspending fluid is substantially transparent.

29. A method according to claim 27 wherein the suspending fluid has a third optical characteristic different from the first and second optical characteristics, and the method further comprises applying to the medium an electric field having a polarity and magnitude sufficient to cause the second particles to move adjacent the first surface of the medium, but leave the first particles held adjacent the first surface of the medium by the magnetic forces acting on the particles, thereby causing the third optical characteristic to be visible at the second surface of the display.

30. A method of addressing an electrophoretic medium, the method comprising:
  (a) providing an electrophoretic medium having opposed first and second surfaces, the medium comprising a suspending fluid, a plurality of a first type of electrically charged magnetic particles having a first optical characteristic suspended in the suspending fluid, a plurality of a second type of electrically charged non-magnetic particles having a second optical characteristic different from the first optical characteristic, the first and second types of particles bearing charges of the same polarity, and a third type of electrically charged non-magnetic particles having a third optical characteristic different from the first and second optical characteristics, the third type of particles bearing charges of opposite polarity to those on the first and second types of particles; the medium having a magnet disposed adjacent its first surface;
  (b) applying to the medium an electric field having a polarity which causes the third type of particles to move adjacent the second surface of the medium, while causing the first and second types of particles to remain adjacent the first surface of the medium, thereby causing the third optical characteristic to be visible at the second surface;
  (c) applying to the medium an electric field having a polarity and magnitude sufficient to cause the second type of particles to move adjacent the second surface of the medium and the third type of particles to move adjacent the first surface of the medium, but insufficient to cause the first type of particles to move away from the first surface of the medium against the magnetic forces acting on the first type of particles, thereby causing the second optical characteristic to be visible at the second surface; and
  (d) applying to the medium an electric field having a polarity and magnitude sufficient to cause the second type of particles to move adjacent the second surface of the medium and the third type of particles to move adjacent the first surface of the medium, the magnitude of the electric field being sufficient to cause the first type of particles to move away from the first surface of the medium against the magnetic forces acting on the first type of particles and lie adjacent the second surface of the medium, thereby causing the first and second optical characteristics to be visible at the second surface.

31. A method of addressing an electrophoretic medium, the method comprising:
  (a) providing an electrophoretic medium having opposed first and second surface, the medium comprising a suspending fluid, a plurality of a first type of electrically charged magnetic particles having a first optical characteristic suspended in the suspending fluid, a plurality of a second type of electrically charged non-magnetic particles having a second optical characteristic different from the first optical characteristic, the first and second types of particles bearing charges of opposite polarity, and a plurality of a third type of electrically charged non-magnetic particles having a third optical characteristic different from the first and second optical characteristics, the second and third types of particles bearing charges of the same polarity, but the second type of particles having higher electrophoretic mobility than the third type of particle; the medium having a magnet disposed adjacent its first surface;

(b) applying to the medium an electric field having a polarity which causes the second and third types of particles to move adjacent the second surface of the medium with the second type of particles lying closer to the second surface, so that the second optical characteristic is visible at the second surface, the first type of particles lying adjacent the first surface of the medium;

(c) applying to the medium an electric field having a polarity and magnitude sufficient to cause the second and third types of particles to move adjacent the first surface of the display, with the third type of particles lying closer to the second surface, the magnitude of the electric field being insufficient to cause the first type of particles to move away from the first surface of the medium against the magnetic forces acting on the first type of particles, thereby causing the third optical characteristic to be visible at the second surface; and (d) applying to the medium an electric field having a polarity and magnitude sufficient to cause the second and third types of particles to move adjacent the first surface of the medium, the magnitude of the electric field being sufficient to cause the first type of particles to move away from the first surface of the medium against the magnetic forces acting on the first type of particles and lie adjacent the second surface of the medium, thereby causing the first optical characteristic to be visible at the second surface.

32. A method of driving an electrophoretic medium to provide a threshold and/or to increase the number of optical states which can be displayed by the medium, the method comprising: providing an electrophoretic medium having opposed first and second surfaces, the medium comprising a suspending fluid having a first optical characteristic, and a plurality of electrically charged magnetic particles suspended in the suspending fluid, the medium having a magnet disposed adjacent its first surface; applying to the medium an electric field having a polarity and magnitude which tends to cause the particles to move towards the second surface of the medium but which is insufficient to overcome the magnetic forces applied to the particles by the magnet, thereby the particles to remain adjacent the first surface of the medium; and applying to the medium an electric field having a polarity and magnitude sufficient to cause the particles to move through the suspending fluid against the magnetic forces applied to the particles by the magnet, thereby causing the particles to move adjacent the second surface of the medium, the optical state of the medium varying depending upon whether the particles are adjacent the first or second surface of the medium.

33. An electrophoretic display comprising:

a layer of an electrophoretic medium comprising a plurality of one or more types of particles suspended in a suspending fluid, said particles including at least one electrically charged, electrophoretically mobile particle capable of translating through the suspending fluid upon application of an electric field to the medium, and at least one magnetic particle;

a first electrode disposed adjacent one side of the layer of electrophoretic medium;

a magnet disposed adjacent the said one said of the layer of electrophoretic medium; and a second electrode disposed adjacent the layer of electrophoretic medium on the opposed side thereof from the first electrode and the magnet.

34. An electrophoretic display according to claim 33 which comprises at least one particle which is both magnetic and electrophoretically mobile.

35. An electrophoretic display according to claim 34 comprising a single type of magnetic, electrophoretically mobile particle in a colored suspending fluid.

36. An electrophoretic display according to claim 33 wherein said magnetic particles have a polymer coating.

37. An electrophoretic display according to claim 33 comprising a plurality of capsules each having a capsule wall, said particles and said suspending fluid being contained within said capsules.

38. An electrophoretic display according to claim 33 wherein said magnet is an electromagnet.

* * * * *